United States Patent

Takase

(10) Patent No.: US 8,984,522 B2
(45) Date of Patent: Mar. 17, 2015

(54) RELAY APPARATUS AND RELAY MANAGEMENT APPARATUS

(75) Inventor: Masaaki Takase, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 518 days.

(21) Appl. No.: 13/273,331

(22) Filed: Oct. 14, 2011

(65) Prior Publication Data

US 2012/0151493 A1    Jun. 14, 2012

(30) Foreign Application Priority Data

Dec. 10, 2010  (JP) ................................ 2010-275789

(51) Int. Cl.
G06F 9/46   (2006.01)
G06F 9/50   (2006.01)

(52) U.S. Cl.
CPC .................................. G06F 9/5083 (2013.01)
USPC .......................................... 718/104; 718/105

(58) Field of Classification Search
CPC .............................. G06F 9/50; G06F 9/5083
USPC ............................................ 718/100, 104, 105
See application file for complete search history.

(56) References Cited

U.S. PATENT DOCUMENTS

| | | | | |
|---|---|---|---|---|
| 7,710,860 | B2 * | 5/2010 | Kano | 370/216 |
| 2003/0048750 | A1 * | 3/2003 | Kobayashi | 370/229 |
| 2003/0145109 | A1 * | 7/2003 | Nakashima | 709/241 |
| 2007/0239888 | A1 * | 10/2007 | Croxford | 709/236 |
| 2007/0294255 | A1 * | 12/2007 | Gross et al. | 707/10 |
| 2010/0251258 | A1 * | 9/2010 | Hanamori et al. | 718/105 |

FOREIGN PATENT DOCUMENTS

| | | |
|---|---|---|
| JP | 09-231184 A | 9/1997 |
| JP | 2000-10936 A | 1/2000 |
| JP | 2003-218916 A | 7/2003 |
| JP | 2004-520641 A | 7/2004 |
| JP | 2009-223517 A | 10/2009 |
| JP | 2009223517 A * | 10/2009 |
| WO | WO-02/25440 | 3/2002 |

OTHER PUBLICATIONS

JP 2009223517 A (Machine Translation).*
Japanese Office Action mailed Jun. 3, 2014 for corresponding Japanese Patent Application No. 2010-275789, with Partial Translation, 5 pages.

* cited by examiner

*Primary Examiner* — Emerson Puente
*Assistant Examiner* — Willy W Huaracha
(74) *Attorney, Agent, or Firm* — Fujitsu Patent Center

(57) ABSTRACT

A relay apparatus executes a reallocation process so as to transfer data received from an information processing apparatus allocated to the relay apparatus to a destination apparatus. The reallocation process includes the following operations. The relay apparatus determines reallocatability of the information processing apparatus on the basis of a status of receiving transfer data from the information processing apparatus. The reallocatability represents whether the information processing apparatus is reallocatable to another apparatus. The relay apparatus stores reallocatability information indicating the determined reallocatability in a storage unit. The relay apparatus determines whether to reallocate the information processing apparatus on the basis of the reallocatability information stored in the storage unit. The relay apparatus reallocates the information processing apparatus determined to be reallocated.

10 Claims, 24 Drawing Sheets

| IP ADDRESS OF APPLICATION APPARATUS | LAST TRANSFER AMOUNT | SECOND-TO-LAST TRANSFER AMOUNT | REALLOCATION STATUS | NUMBER OF ACQUISITION FAILURES |
|---|---|---|---|---|
| 10.0.0.1 | 2MB | 2MB | REALLOCATABLE | - |
| 10.0.0.2 | 3MB | 1MB | NONREALLOCATABLE | - |
| 10.0.0.3 | 1MB | 1MB | UNDER REALLOCATION | - |
| 10.0.0.4 | 1MB | - | IN FAILURE | 3 |

FIG. 4

| VM IDENTIFIER | IP ADDRESS OF COLLECTION APPARATUS |
|---|---|
| vm0001 | 20.0.0.1 |
| vm0002 | 20.0.0.1 |
| vm0003 | 20.0.0.2 |
| vm0004 | 20.0.0.3 |

FIG. 5

| TRANSFER AMOUNT VARIATION THRESHOLD | CPU UTILIZATION THRESHOLD |
|---|---|
| 500KB | 50% |

| IP ADDRESS OF RELAY APPARATUS | IP ADDRESS OF APPLICATION APPARATUS |
|---|---|
| 100.0.0.1 | 10.0.0.1 |
| 100.0.0.1 | 10.0.0.2 |
| 100.0.0.1 | 10.0.0.3 |
| 100.0.0.1 | 10.0.0.4 |
| 100.0.0.2 | 10.0.0.5 |
| 100.0.0.2 | 10.0.0.6 |
| 100.0.0.2 | 10.0.0.7 |
| 100.0.0.2 | 10.0.0.8 |

| IP ADDRESS OF RELAY APPARATUS | CPU UTILIZATION | LARGE-VARIATION CPU UTILIZATION | NEXT TRANSFER AMOUNT |
|---|---|---|---|
| 100.0.0.1 | 70% | 20% | 20MB |
| 100.0.0.2 | 50% | 0% | 15MB |
| 100.0.0.3 | 60% | 40% | 18MB |

| IP ADDRESS OF APPLICATION APPARATUS | VM IDENTIFIER | IP ADDRESS OF COLLECTION APPARATUS |
|---|---|---|
| 10.0.0.1 | vm0001 | 20.0.0.1 |
| 10.0.0.1 | vm0002 | 20.0.0.1 |
| 10.0.0.2 | vm0003 | 20.0.0.2 |
| 10.0.0.2 | vm0004 | 20.0.0.3 |
| ... | ... | ... |

| CPU UTILIZATION UNCONDITIONAL ALLOCATION THRESHOLD | CPU UTILIZATION CONDITIONAL ALLOCATION THRESHOLD | LARGE-VARIATION CPU UTILIZATION THRESHOLD |
|---|---|---|
| 60% | 70% | 50% |

34

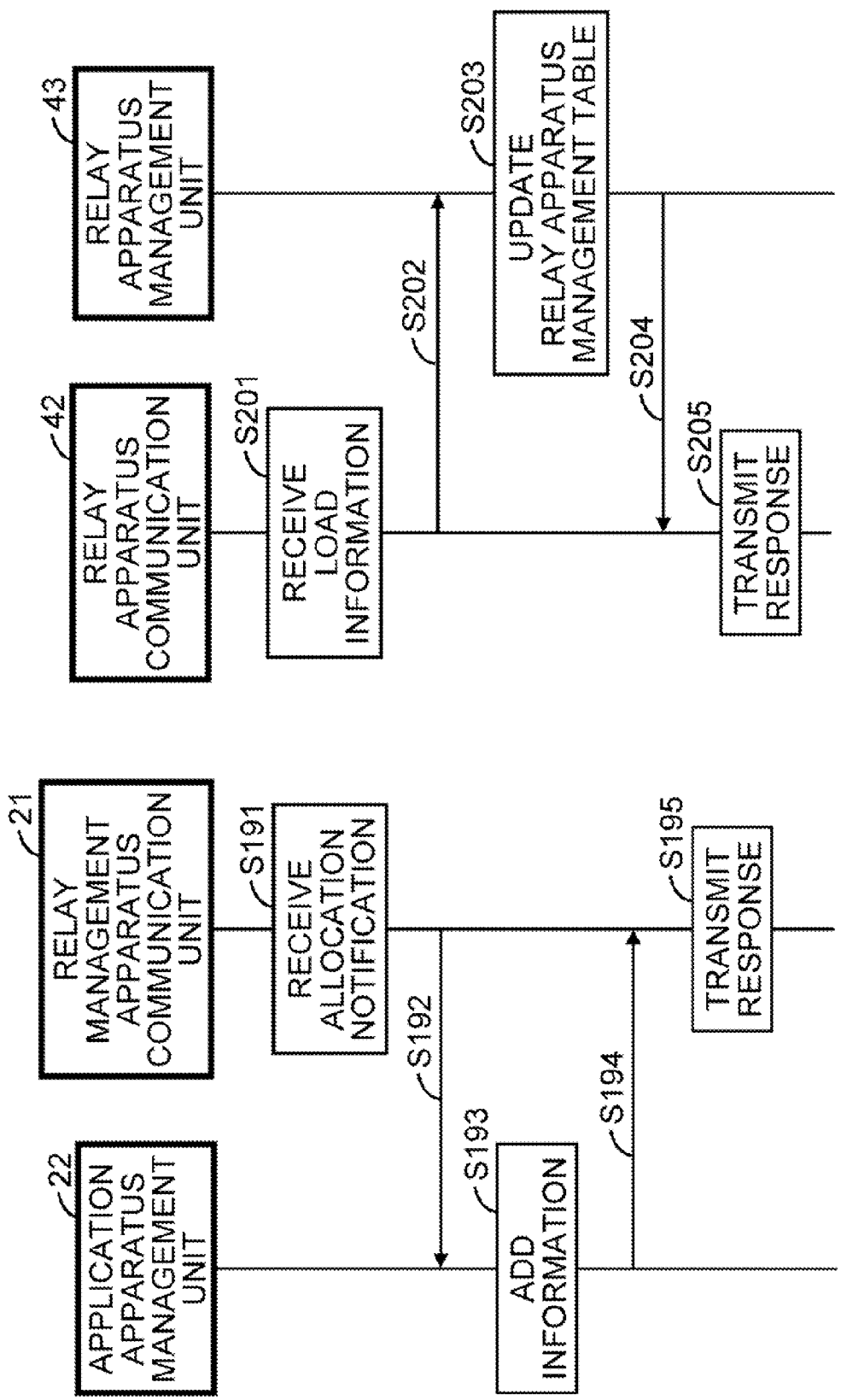

RELAY APPARATUS AND RELAY MANAGEMENT APPARATUS

CROSS-REFERENCE TO RELATED APPLICATION

This application is based upon and claims the benefit of priority of the prior Japanese Patent Application No. 2010-275789, filed on Dec. 10, 2010, the entire contents of which are incorporated herein by reference.

FIELD

The embodiments discussed herein are related to techniques for distributing loads of relay apparatuses.

BACKGROUND

In systems in which a plurality of information processing apparatuses perform distributed processing, various techniques for performing appropriate load distribution have been proposed. In such distributed processing, not only allocation of information processing but also reallocation thereof may be performed on the basis of the operational statuses.

Examples of employed techniques for load distribution include a technique in which an agent selects an information processing unit with low utilization among a plurality of information processing units in a system performing distributed processing and allocates a processing request to the selected information processing unit. In this technique, each information processing unit transmits, on the basis of the processing status thereof, a request for reallocation of a processing request to the agent. Upon receipt of the reallocation request, the agent migrates a processing request managed by another information processing unit to the information processing unit that has transmitted the reallocation request.

According to another exemplary technique, an object-oriented client server system manages respective load statuses of servers and migrates a server object to a server with a low load on the basis of the load statuses.

Further, a technique has been proposed in which distribution of applications is performed in accordance with a predetermined algorithm when applications are executed in distributed platforms.

Japanese Laid-open Patent Publication No. 09-231184, Japanese Laid-open Patent Publication No. 2000-10936, and Japanese Laid-open Patent Publication No. 2004-520641 disclose related techniques.

SUMMARY

According to an aspect of the present invention, provided is a computer-readable, non-transitory medium storing a program that causes a relay apparatus to execute a reallocation process. The relay apparatus transfers data received from an information processing apparatus allocated to the relay apparatus to a destination apparatus. The reallocation process includes the following operations. The relay apparatus determines reallocatability of the information processing apparatus on the basis of a status of receiving transfer data from the information processing apparatus. The reallocatability represents whether the information processing apparatus is reallocatable to another apparatus. The relay apparatus stores reallocatability information indicating the determined reallocatability in a storage unit. The relay apparatus determines whether to reallocate the information processing apparatus on the basis of the reallocatability information stored in the storage unit. The relay apparatus reallocates the information processing apparatus determined to be reallocated.

The object and advantages of the invention will be realized and attained by means of the elements and combinations particularly pointed out in the claims. It is to be understood that both the foregoing general discussion and the following detailed discussion are exemplary and explanatory and are not restrictive of the invention, as claimed.

BRIEF DESCRIPTION OF DRAWINGS

FIG. 4 is a diagram illustrating an exemplary data structure of an application apparatus management table according to an embodiment of the present invention;

FIG. 5 is a diagram illustrating an exemplary data structure of a destination table according to an embodiment of the present invention;

FIG. 6 is a diagram illustrating an exemplary data structure of a common information table according to an embodiment of the present invention;

FIG. 8 is a diagram illustrating an exemplary data structure of a relay apparatus management table according to an embodiment of the present invention;

FIG. 9 is a diagram illustrating an exemplary data structure of an allocation table according to an embodiment of the present invention;

FIG. 10 is a diagram illustrating an exemplary data structure of a destination table according to an embodiment of the present invention;

FIG. 11 is a diagram illustrating an exemplary data structure of a common information table according to an embodiment of the present invention;

FIG. 19 is a diagram illustrating an exemplary process within a relay apparatus for reallocating an application apparatus according to an embodiment of the present invention;

FIG. 20 is a diagram illustrating an exemplary process within a relay management apparatus according to an embodiment of the present invention;

DESCRIPTION OF EMBODIMENTS

Figure 1:
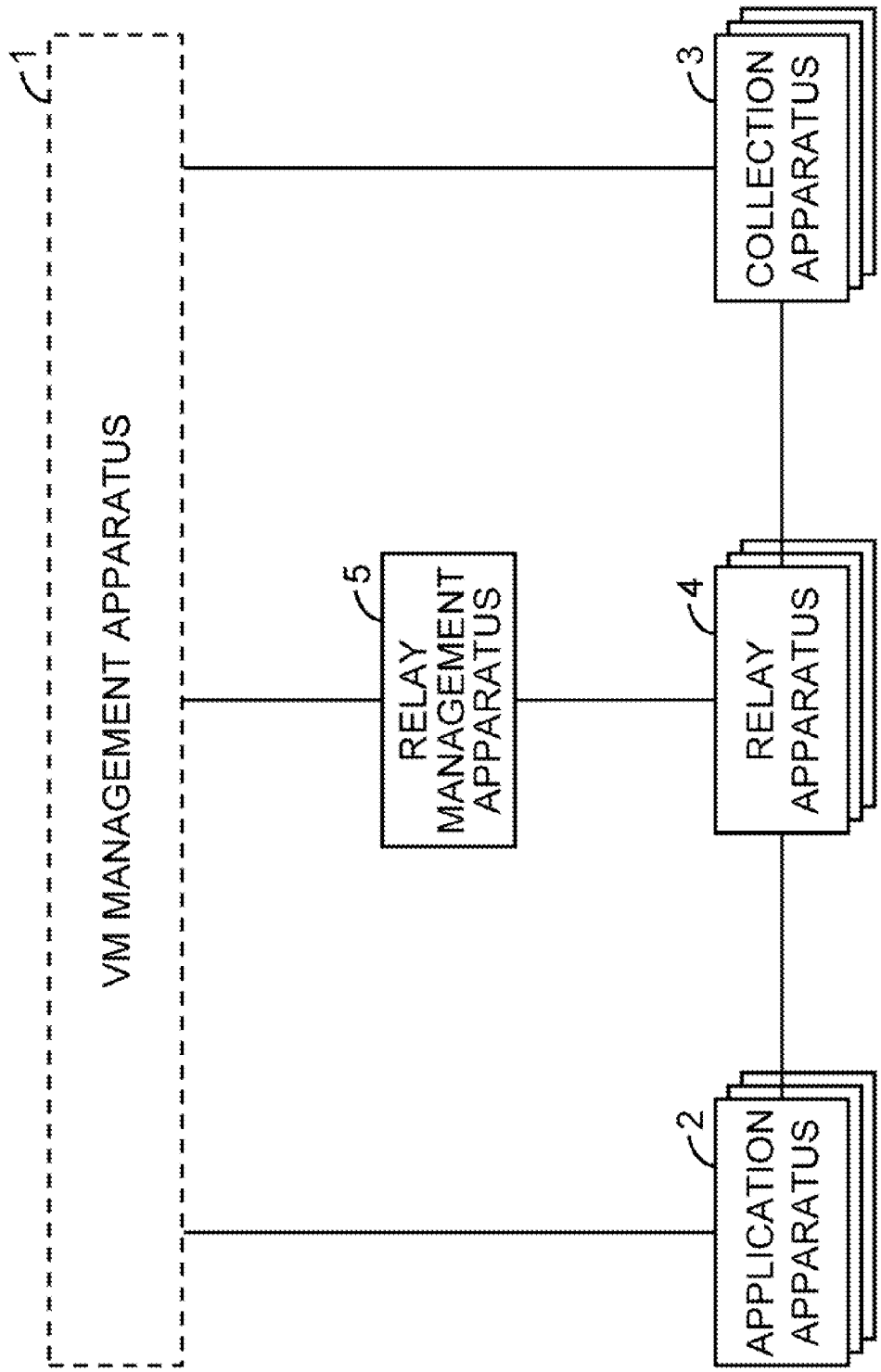
FIG. 1 is a diagram illustrating an exemplary entire configuration of a system according to an embodiment of the present invention.

One example of load distribution systems is a system including a plurality of relay apparatuses that transfer data transmitted from an information processing apparatus to a specified transfer destination. In such a system, information processing apparatuses as data transfer sources are allocated to relay apparatuses to distribute relay processes. Allocation of information processing apparatuses is changed (reallocated) on the basis of the processing statuses of relay apparatuses. However, in such a data relay system, a case is known in which an information processing apparatus to be reallocated is not appropriately selected, and even when reallocation is performed, processing efficiency is not effectively increased from the viewpoint of the system as a whole. Also in the conventional techniques mentioned above, good design has not necessarily been made with regard to which information processing is to be reallocated, that is, selection of an appropriate object has not been made at the time of selecting an object to be reallocated.

Thus, it is preferable to provide a technique which allows to select an appropriate information processing apparatus in the reallocation of an information processing apparatus to data relay apparatuses so as to increase the processing efficiency of a system as a whole obtained by load distribution of relay processes.

According to the embodiments, the processing efficiency of a system as a whole obtained by load distribution of data relay processes may be increased.

In the description, techniques for reallocating a data relay process from one relay apparatus to another relay apparatus will be discussed, in a system including a plurality of relay apparatuses performing the data relay process. Specifically, information processing apparatuses which are the sources of relayed data are allocated to the plurality of relay apparatuses. An information processing apparatus allocated to a relay apparatus may be reallocated to another relay apparatus as needed. Reallocatability information is stored in a storage unit for each information processing apparatus. The reallocatability information indicates reallocatability of the information processing apparatus, that is, whether the information processing apparatus may be reallocated to another relay apparatus. When there is a relay apparatus whose processing load is high (or expected to become high), selection is made as to which one among the information processing apparatuses allocated to the relay apparatus is to be reallocated to another relay apparatus on the basis of the reallocatability information regarding the information processing apparatuses. Thereby, an information processing apparatus which is to be reallocated to another relay apparatus may be appropriately selected, resulting in effective reallocation. As a result, from the viewpoint of a system as a whole, information processing resources of a scale-out relay apparatuses are effectively utilized and data relay processes may be efficiently performed.

First Embodiment

In a first embodiment, an example is discussed in which, in a system for providing customers with virtual machines (VMs) which are created in a server node pool, the above-discussed technique is applied to processes for providing customers with VM statistical information, i.e., various kinds of information regarding operational statuses of the VMs. Specifically, in this system, a relay apparatus relays the VM statistical information (relayed data) generated by an application apparatus (an information processing apparatus) which is a server in which the VM is created to a collection apparatus (a transfer destination apparatus) which is a server that collects the VM statistical information. The VM statistical information includes, for example, information regarding physical resources allocated to the VMs. The VM statistical information is provided to customers to visualize the content of service. The reason why the VM statistical information is relayed by introducing the relay apparatuses is to separate, from the application apparatuses, processes for distributing the VM statistical information in the application apparatuses to collection apparatuses relevant to customers who are provided with the VMs. Thereby, the VM statistical information may be efficiently distributed to the collection apparatuses even when there are many of the application apparatuses and collection apparatuses, enabling flexible adaptation to a change in the system configuration, such as a change in VM configuration statuses and a change in the collection apparatuses.

FIG. 1 illustrates an exemplary entire configuration of a system according to the present embodiment. This system includes a VM management apparatus 1, application apparatuses 2 in which VMs are created, collection apparatuses 3, relay apparatuses 4, and a relay management apparatus 5. The VM management apparatus 1, the application apparatuses 2, the collection apparatuses 3, the relay apparatuses 4, and the relay management apparatus 5 are information processing apparatuses having a central processing unit (CPU) and a storage unit. Here, a storage unit refers to at least one of a volatile storage unit such as a memory or a non-volatile storage unit such as a hard disc drive (HDD).

The VM management apparatus 1 may communicate with external customer systems (not illustrated) and the application apparatuses 2. The VM management apparatus 1 creates VMs in the application apparatuses 2 in accordance with requests received from the customer systems. The VM management apparatus 1 may communicate with the collection apparatuses 3. The VM management apparatus 1 manages mapping between the customer systems to which the VMs are provided and the collection apparatuses 3 that collect statistical information regarding the VMs. The VM management apparatus 1 may communicate with the relay management apparatus 5. The VM management apparatus 1 transmits, to the relay management apparatus 5, system configuration information that includes information regarding the application apparatuses 2 in which VMs are created and mapping information regarding the collection apparatuses 3 to which VM statistical information is transmitted. When the system configuration has been changed owing to addition of the application apparatuses 2 or the collection apparatuses 3, the VM management apparatus 1 notifies the relay management apparatus 5 of the system configuration information including the change information.

The application apparatus 2 may communicate with the VM management apparatus 1. The application apparatus 2 is an apparatus in which VMs are created by the VM management apparatus 1 in accordance with requests from customer systems. The application apparatus 2 may communicate with a relay apparatus 4. The application apparatus 2 extracts VM statistical information regarding VMs created in the application apparatus 2 every predetermined period of time and transmits the extracted VM statistical information to the relay apparatus 4 in response to a request from the relay apparatus 4.

The collection apparatus 3 may communicate with the relay apparatuses 4. The collection apparatus 3 receives VM statistical information transmitted from the relay apparatuses 4, and outputs the VM statistical information, after performing statistical processing using applications as needed, to provide the VM statistical information to customers. The collection apparatuses 3 may also communicate with the VM management apparatus 1. The VM management apparatus 1 manages the system configurations of the collection apparatuses 3. The collection apparatuses 3 may be part of customer apparatuses.

The relay apparatus 4 may communicate with the relay management apparatus 5. The relay apparatus 4 receives, from the relay management apparatus 5, information regarding the application apparatuses 2 allocated thereto and regarding mapping between VMs and the collection apparatuses 3 to which VM statistical information is to be transferred. The relay apparatuses 4 may communicate with the application apparatuses 2 and the collection apparatuses 3. The relay apparatuses 4 transfers the VM statistical information received from the application apparatuses 2 to the collection apparatuses 3 on the basis of the information received from the relay management apparatus 5. When processing load thereof is high or going to be high, the relay apparatus 4 selects, from among the application apparatuses 2 allocated thereto, an application apparatus 2 which is to be reallocated to another relay apparatus 4. The relay apparatus 4 transmits a reallocation request regarding the selected application apparatus 2 to the relay management apparatus 5 to reallocate the selected application apparatus 2.

The relay management apparatus 5 may communicate with the VM management apparatus 1. The relay management apparatus 5 receives system configuration information from the VM management apparatus 1. The relay management apparatus 5 determines allocation of the application apparatuses 2 to the relay apparatuses 4 on the basis of the information received from the VM management apparatus 1. The relay management apparatus 5 may communicate with the relay apparatuses 4. The relay management apparatus 5 notifies the relay apparatuses 4 of information regarding the allocation of the application apparatuses 2 to the relay apparatuses 4 and mapping between VMs and the collection apparatuses 3 to which the VM statistical information is transmitted. When an application apparatus 2 allocated to a relay apparatus 4 is to be reallocated, the relay management apparatus 5 determines a relay apparatus 4 to which the application apparatus 2 is to be reallocated, and notifies the determined relay apparatus 4 of the determination result.

Note that in the present embodiment, communication among the apparatuses is realized by local area network (LAN) connection. However, such communication is not limited to an LAN, and may be realized by any means such as a wide area network (WAN) and the Internet, and the methods of communication may be either wired communication or wireless communication.

Figure 2:
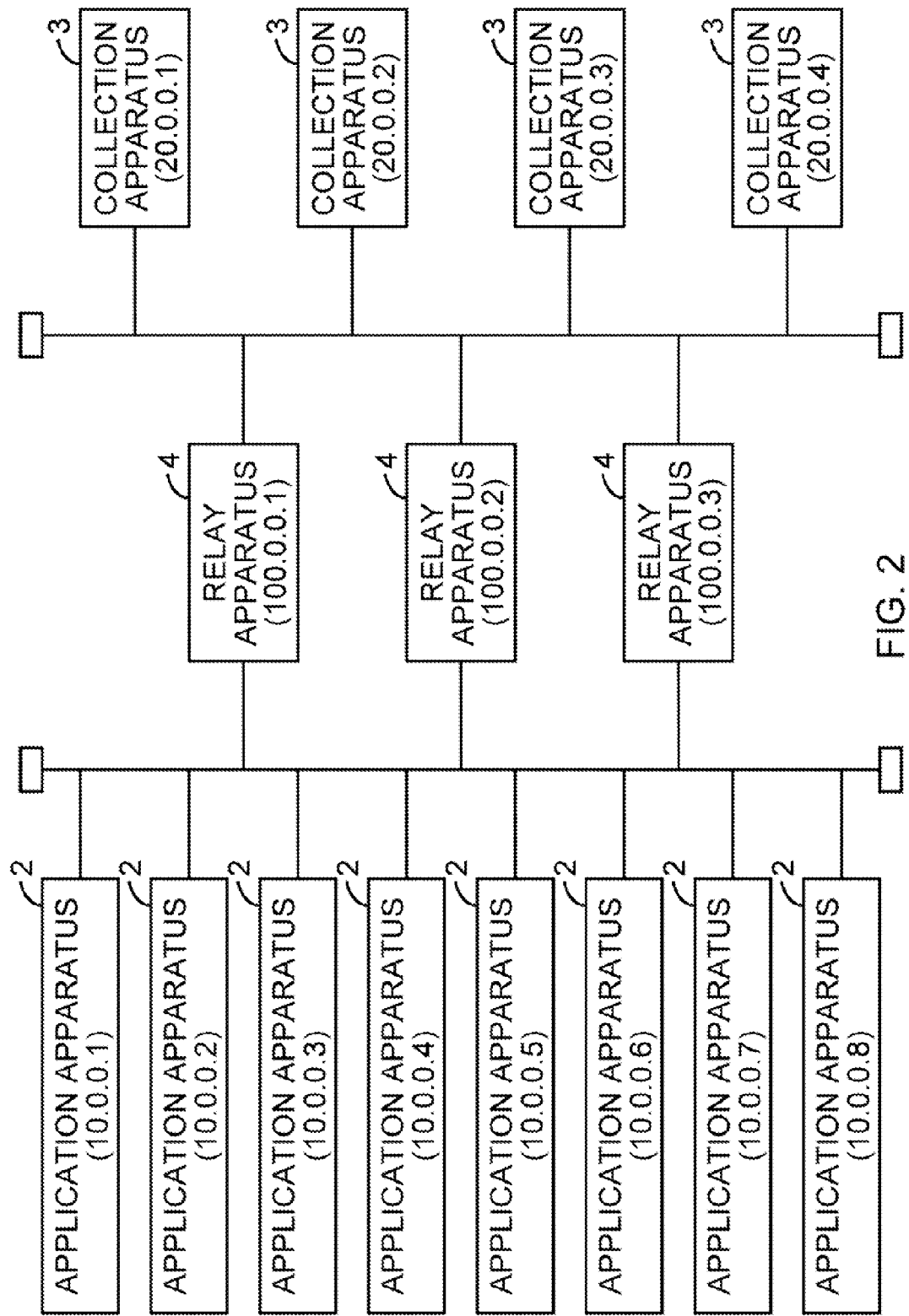
FIG. 2 is a diagram illustrating an exemplary network connection configuration among application apparatuses, collection apparatuses, and relay apparatuses according to an embodiment of the present invention.

FIG. 2 illustrates an exemplary network connection configuration among the application apparatuses 2, the collection apparatuses 3, and the relay apparatuses 4 according to the present embodiment. Each of the application apparatuses 2, the collection apparatuses 3, and the relay apparatuses 4 has an internet protocol (IP) address assigned thereto. Each of the relay apparatuses 4 is connected to each of the application apparatuses 2 and each of the collection apparatuses 3. The numbers of the application apparatuses 2, the collection apparatuses 3, and the relay apparatuses 4 illustrated in FIG. 2 are only examples.

Figure 3:
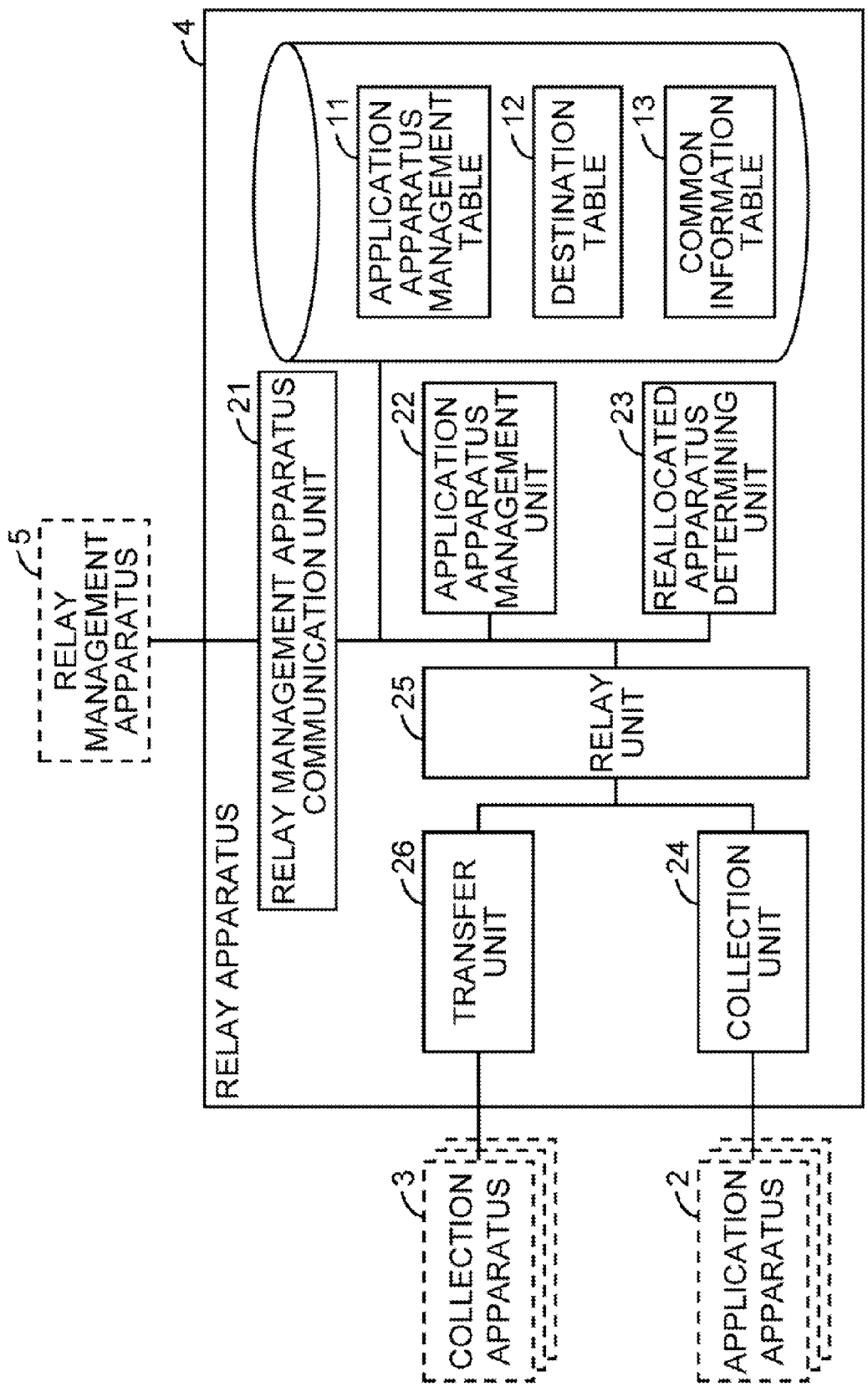
FIG. 3 is a diagram illustrating an exemplary functional configuration of a relay apparatus according to an embodiment of the present invention.

Configurations of the relay management apparatus 5 and the relay apparatus 4 will be discussed in detail. FIG. 3 illustrates an exemplary functional configuration of the relay apparatus 4 according to the present embodiment. The relay apparatus 4 has an application apparatus management table 11, a destination table 12, and a common information table 13 stored in a storage unit. The relay apparatus 4 includes control units such as a relay management apparatus communication unit 21, an application apparatus management unit 22, a reallocated apparatus determining unit 23, a collection unit 24, a relay unit 25, and a transfer unit 26. The CPU of the relay apparatus 4 realizes the control units by executing a program loaded in a memory.

The application apparatus management table 11 is a table storing various types of information regarding a relay process for each of the application apparatuses 2 allocated to the relay apparatus 4. FIG. 4 illustrates an exemplary data structure of the application apparatus management table 11 according to the present embodiment. As illustrated in FIG. 4, the application apparatus management table 11 includes the following items: an IP address of the application apparatus 2 allocated to the relay apparatus 4 and last and second-to-last transfer amounts respectively showing the transfer amounts of VM statistical information transmitted from the application apparatus 2 at the time of the last collection process and at the time of the second-to-last collection process during periodical VM statistical information collection process. The application apparatus management table 11 also includes the following items: a reallocation status which shows reallocatability information indicating whether the application apparatus 2 may be reallocated to another relay apparatus 4, and the number of acquisition failures, which represents the number of failures in collection process when failures occur in the process for collecting VM statistical information.

The destination table 12 is a table for mapping between VMs created in the application apparatuses 2 allocated to the relay apparatus 4 and the collection apparatuses 3 to which VM statistical information is transferred. FIG. 5 illustrates an exemplary data structure of the destination table 12 according to the present embodiment. As illustrated in FIG. 5, the destination table 12 includes a VM identifier for identifying a VM and an IP address of the corresponding collection apparatus 3.

The common information table 13 is a table storing thresholds used for various types of determination. FIG. 6 illustrates an exemplary data structure of the common information table 13 according to the present embodiment. As illustrated in FIG. 6, the common information table 13 includes a transfer amount variation threshold used to determine whether the variation in the transfer amount of VM statistical information is small or large, and a CPU utilization threshold used to determine whether the processing load of the relay apparatus 4 is small or large. The transfer amount variation threshold and the CPU utilization threshold are set in advance by a system administrator, for example.

The relay management apparatus communication unit 21 functions as a communication interface with the relay management apparatus 5. Specifically, the relay management apparatus communication unit 21 receives from the relay management apparatus 5 various types of information, such as information regarding the application apparatuses 2 in which VMs are created and mapping information regarding the collection apparatuses 3 to which VM statistical information is transferred, and notifies the application apparatus management unit 22 and the relay unit 25 of the received information. In addition, the relay management apparatus communication unit 21 transmits to the relay management apparatus 5 load information regarding the relay apparatus 4 itself and requests the relay management apparatus 5 to reallocate the application apparatuses 2. The load information includes, for example, the CPU utilization in the relay apparatus 4. According to the present embodiment, the CPU utilization includes, as a part thereof, a large-variation CPU utilization which is a sum of CPU utilizations used for relay process of VM statistical information received from the application apparatuses 2 in which variation in the transfer amounts of VM statistical information is larger than a predetermined threshold. The load information includes a next transfer amount which is predicted for the next VM statistical information collection process as the sum of VM statistical information transfer amounts received from the application apparatuses 2 and transferred to the collection apparatuses 3, for all the application apparatuses 2 allocated to the relay apparatus 4.

The application apparatus management unit 22 manages various types of information related to the application apparatuses 2 allocated to the relay apparatus 4. Specifically, the application apparatus management unit 22 updates (adding or deleting data regarding the application apparatuses 2) the application apparatus management table 11 on the basis of, for example, information indicating allocation of the application apparatuses 2, which is received from the relay management apparatus communication unit 21. The application apparatus management unit 22 updates the reallocation statuses in the application apparatus management table 11 in accordance with statuses in which VM statistical information is received from the application apparatuses 2. When the reallocated apparatus determining unit 23 selects an application apparatus 2 to be reallocated to another relay apparatus 4, the application apparatus management unit 22 acquires information regarding the application apparatuses 2 with reference to the application apparatus management table 11, and notifies the reallocated apparatus determining unit 23 of the acquired information. The application apparatus management unit 22 also updates the destination table 12 on the basis of change information, received from the relay management apparatus communication unit 21, regarding the collection apparatuses 3 to which VM statistical information is transferred.

The reallocated apparatus determining unit 23 selects an application apparatus 2 which is to be reallocated to another relay apparatus 4 on the basis of the information regarding the application apparatuses 2 received from the application apparatus management unit 22. The reallocated apparatus determining unit 23 transmits, to the relay management apparatus communication unit 21, information for identifying the selected application apparatus 2 and a request to reallocate the selected application apparatus 2.

The collection unit 24, the relay unit 25, and the transfer unit 26 have the following functions, respectively. The collection unit 24 receives VM statistical information from the application apparatuses 2 and transmits it to the relay unit 25. The relay unit 25 refers to the destination table 12, and on the basis of VM identifiers attached to the VM statistical information, determines a collection apparatus 3 to which relayed data is transferred and transmits information for identifying the collection apparatus 3 together with the VM statistical information to the transfer unit 26. The transfer unit 26 transfers the VM statistical information received from the relay unit 25 to the collection apparatus 3 which is the transfer destination of the VM statistical information. The relay unit 25 also updates a destination table 12 on the basis of the change information, received from the relay management apparatus communication unit 21, regarding the collection apparatus 3 which is the transfer destination of the VM statistical information.

Figure 7:
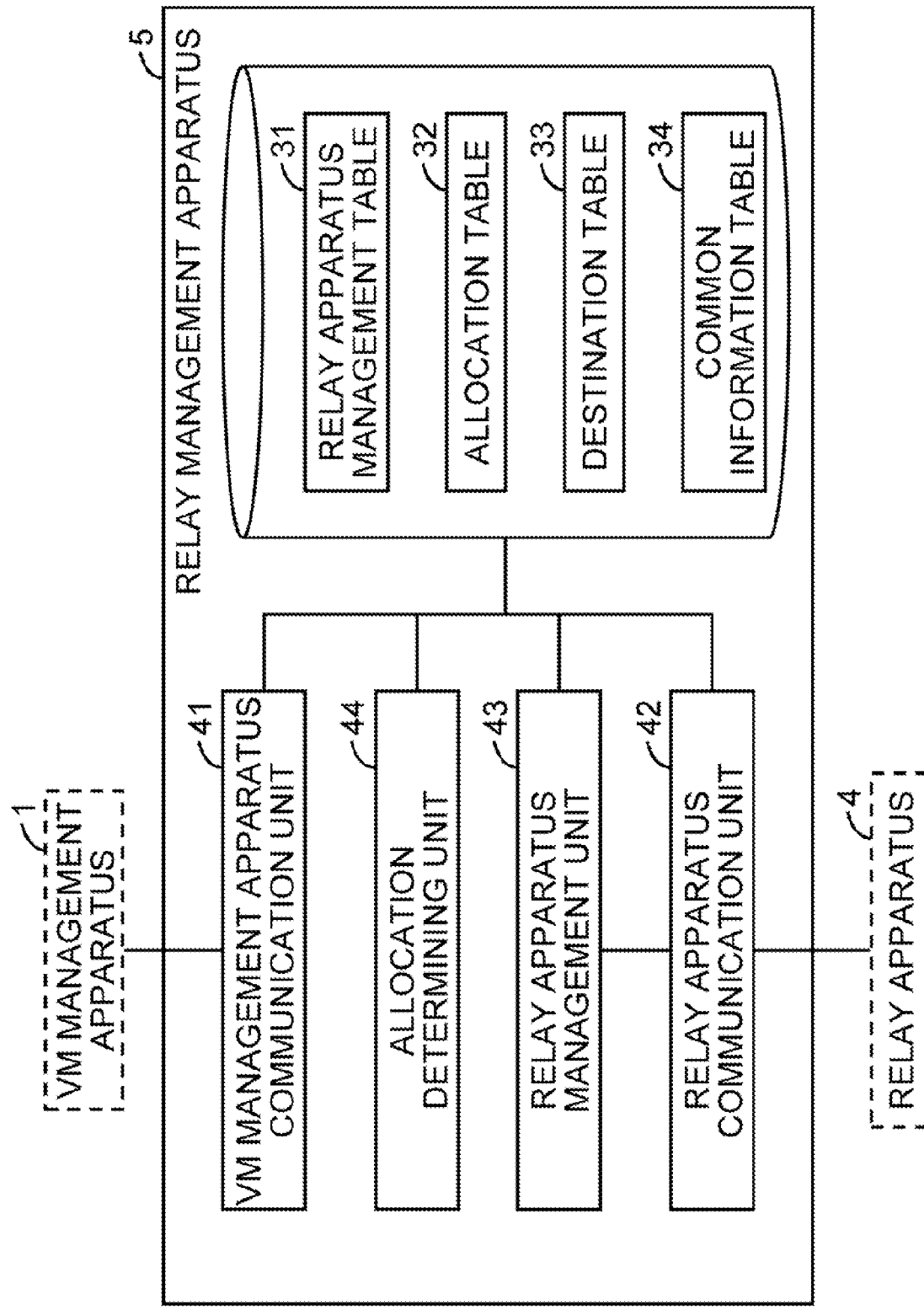
FIG. 7 is a diagram illustrating an exemplary functional configuration of a relay management apparatus according to an embodiment of the present invention.

FIG. 7 illustrates an exemplary functional configuration of the relay management apparatus 5 according to the present embodiment. As illustrated in FIG. 7, the relay management apparatus 5 has a relay apparatus management table 31, an allocation table 32, the destination table 33, and a common information table 34 in a storage unit. The relay management apparatus 5 includes control units such as a VM management apparatus communication unit 41, a relay apparatus communication unit 42, a relay apparatus management unit 43, and an allocation determining unit 44. The CPU of the relay management apparatus 5 realizes the control units by executing a program loaded in a memory.

The relay apparatus management table 31 is a table storing load information regarding each of the relay apparatuses 4. FIG. 8 illustrates an exemplary data structure of the relay apparatus management table 31 according to the present embodiment. As illustrated in FIG. 8, the relay apparatus management table 31 includes the following items: an IP address of the relay apparatus 4, the CPU utilization of the relay apparatus 4, a large-variation CPU utilization of the relay apparatus 4, and a next transfer amount of the relay apparatus 4.

The allocation table 32 is a table for mapping between the relay apparatuses 4 and the application apparatuses 2 allocated to the relay apparatuses 4. FIG. 9 illustrates an exemplary data structure of the allocation table 32 according to the present embodiment. As illustrated in FIG. 9, the allocation table 32 includes the following items: an IP address of the relay apparatus 4 and an IP address of the application apparatus 2.

The destination table 33 is a table showing the correspondence among the application apparatuses 2, VMs created in the application apparatuses 2, and the collection apparatuses 3 to which VM statistical information is transferred, in the entire system. FIG. 10 illustrates an exemplary data structure of the destination table 33 according to the present embodiment. As illustrated in FIG. 10, the destination table 33 includes the following items: an IP address of the application apparatus 2, a VM identifier, and an IP address of the collection apparatus 3.

The common information table 34 is a table storing thresholds used for various types of determination performed by the relay management apparatus 5. FIG. 11 illustrates an exemplary data structure of the common information table 34 according to the present embodiment. As illustrated in FIG. 11, the common information table 34 includes a CPU utilization unconditional allocation threshold, a CPU utilization conditional allocation threshold, and a large-variation CPU utilization threshold. The details of how these thresholds are used will be discussed later in the discussions of the respective processes.

The VM management apparatus communication unit 41 functions as a communication interface with the VM management apparatus 1. Specifically, the VM management apparatus communication unit 41 receives system configuration information from the VM management apparatus 1 and notifies the relay apparatus management unit 43 of the received system configuration information.

The relay apparatus communication unit 42 functions as a communication interface with the relay apparatuses 4. Specifically, the relay apparatus communication unit 42 receives load information regarding the relay apparatuses 4 or requests for reallocating the application apparatuses 2 from the relay apparatuses 4, and notifies the relay apparatus management unit 43 or the allocation determining unit 44 of the received information. The relay apparatus communication unit 42 transmits information regarding the allocation of the application apparatuses 2 or information for identifying the collection apparatuses 3 to which VM statistical information is transmitted to the relay apparatuses 4.

The relay apparatus management unit 43 manages various types of information regarding the relay apparatuses 4. Specifically, the relay apparatus management unit 43 acquires information with reference to the relay apparatus management table 31, and updates the relay apparatus management table 31 on the basis of information transferred from the VM management apparatus communication unit 41 and the relay apparatus communication unit 42. The relay apparatus management unit 43 also updates the destination table 33 on the basis of information, transferred from the VM management apparatus communication unit 41, regarding mapping between VMs and the collection apparatuses 3 to which VM statistical information is transferred.

The allocation determining unit 44 determines the application apparatuses 2 to be allocated to the relay apparatuses 4. Specifically, the allocation determining unit 44 allocates an application apparatus 2 to one of the relay apparatuses 4 on the basis of information regarding addition or deletion of the application apparatus 2 received from the VM management apparatus communication unit 41 and updates the allocation table 32. The allocation determining unit 44 selects, in accordance with a request for reallocating an application apparatus 2 received from a relay apparatus 4, another relay apparatus 4 to which the application apparatus 2 is reallocated, changes the allocation of the application apparatus 2, and updates the allocation table 32.

Next, operations of the apparatuses will be discussed.

Figure 12:
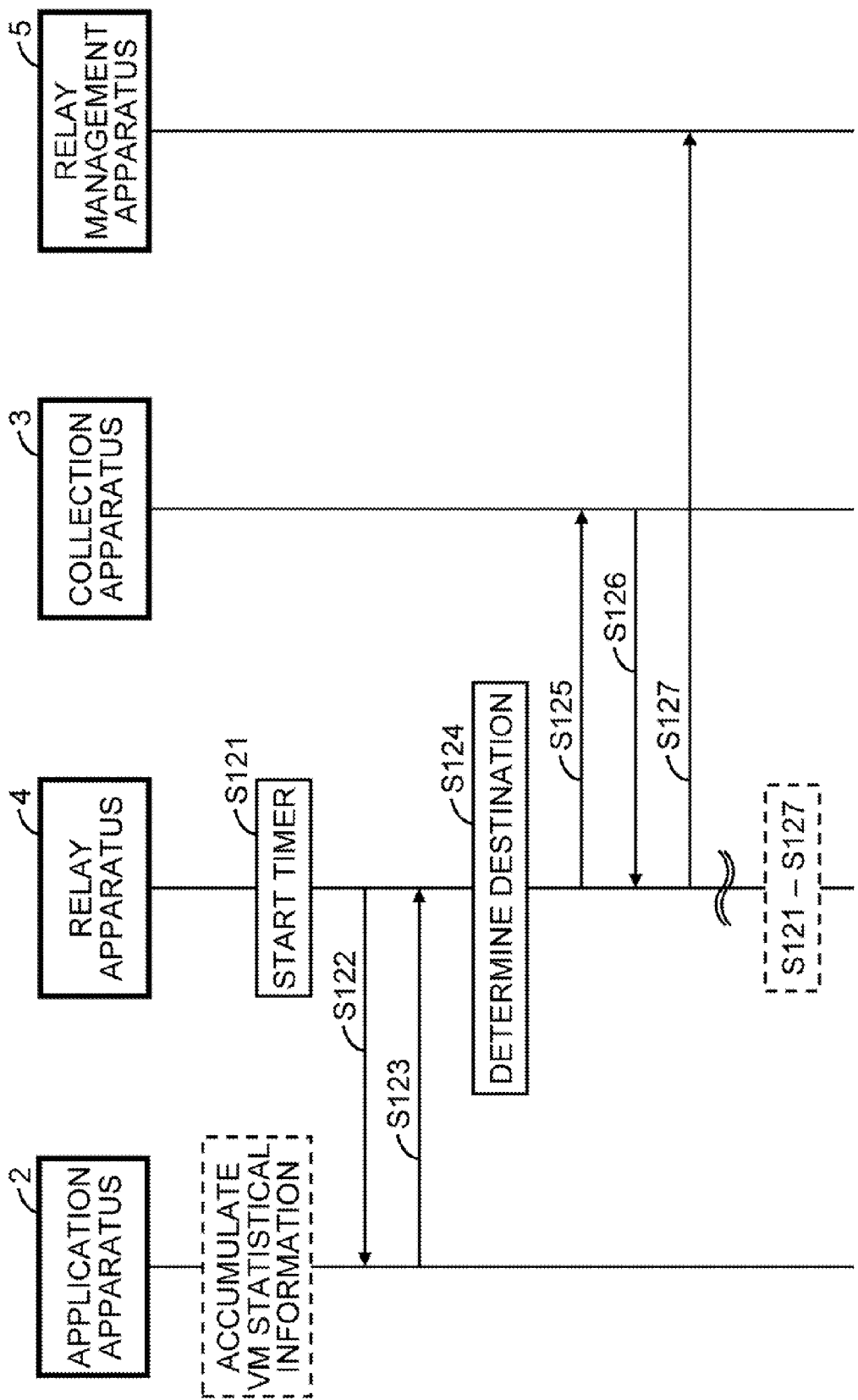
FIG. 12 is a diagram illustrating an exemplary periodical collection process for VM statistical information according to an embodiment of the present invention.

FIG. 12 illustrates an exemplary periodical collection process for VM statistical information.

The application apparatus 2 accumulates VM statistical information regarding VMs created therein.

In S121, the relay apparatus 4 starts a timer every predetermined period of time.

In S122, the relay apparatus 4 transmits a request for VM statistical information to the application apparatus 2.

In S123, the application apparatus 2, in response to the request, transmits accumulated VM statistical information to the relay apparatus 4.

In S124, the relay apparatus 4, upon receipt of the VM statistical information from the application apparatus 2, determines a collection apparatus 3 to which the received VM statistical information is transferred.

In S125, the relay apparatus 4 transmits the VM statistical information to the determined collection apparatus 3.

In S126, the collection apparatus 3 responds to the relay apparatus 4 with a response message indicating that the VM statistical information has been received.

In S127, the relay apparatus 4 transmits load information thereof to the relay management apparatus 5.

After a predetermined period of time, the relay apparatus 4 starts the timer again. Thus, S121 to S127 is repeated. The transmission of the load information regarding the relay apparatus 4 in S127 may be performed every predetermined period of time independent of the process for collecting VM statistical information.

Figure 13:
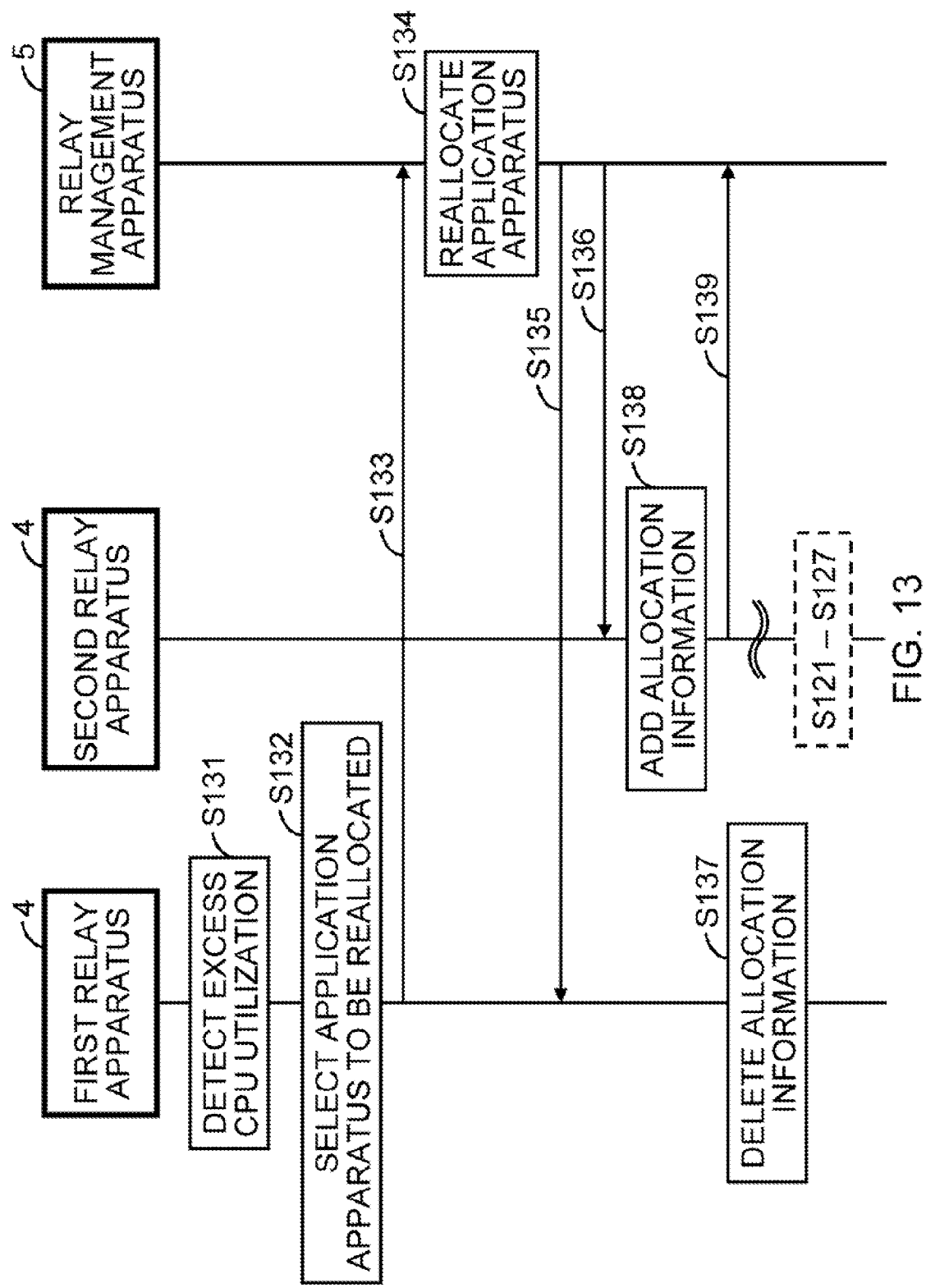
FIG. 13 is a diagram illustrating an exemplary process for reallocating an application apparatus according to an embodiment of the present invention.

FIG. 13 illustrates an exemplary process for reallocating an application apparatus 2 according to the present embodiment. Referring to FIG. 13, an exemplary process for reallocating an application apparatus 2 allocated to a present relay apparatus 4 to another relay apparatus 4 will be discussed as in a case in which the CPU utilization of the present relay apparatus 4 exceeds the CPU utilization threshold. The present relay apparatus 4 may detect that the CPU utilization thereof has exceeded the CPU utilization threshold at any time. In the discussion here, the present relay apparatus 4 whose CPU utilization has exceeded the CPU utilization threshold is referred to as a first relay apparatus 4, and the relay apparatus 4 to which the application apparatus 2 allocated to the first relay apparatus 4 is reallocated is referred to as a second relay apparatus 4.

In S131, the first relay apparatus 4 detects that the CPU utilization has exceeded the CPU utilization threshold.

In S132, the first relay apparatus 4 selects an application apparatus 2 to be reallocated to another relay apparatus 4 from among the application apparatuses 2, relay process for which has been allocated to the first relay apparatus 4.

In S133, the first relay apparatus 4 transmits to the relay management apparatus 5 a request to reallocate the selected application apparatus 2 to another relay apparatus 4.

In S134, the relay management apparatus 5, upon receipt of the request from the first relay apparatus 4, selects a second relay apparatus 4 to which the application apparatus 2 will be reallocated, and reallocates the application apparatus 2 to the selected second relay apparatus 4.

In S135, the relay management apparatus 5 responds to the first relay apparatus 4 with a response message indicating that the application apparatus 2 to be reallocated has been reallocated to the second relay apparatus 4.

In S136, the relay management apparatus 5 notifies the second relay apparatus 4 that the application apparatus 2 has been reallocated to the second relay apparatus 4.

In S137, the first relay apparatus 4 deletes information regarding the reallocated application apparatus 2 from the information regarding the application apparatuses 2 allocated to the first relay apparatus 4.

In S138, the second relay apparatus 4 adds information regarding the reallocated application apparatus 2 to the information regarding the application apparatuses 2 allocated to the second relay apparatus 4.

In S139, the second relay apparatus 4 responds to the relay management apparatus 5 with a response message indicating that the addition of the application apparatus 2 has been completed.

The second relay apparatus 4 starts a timer every predetermined period of time. Thus, operations similar to S121 to S127 are repeated.

Figure 14:
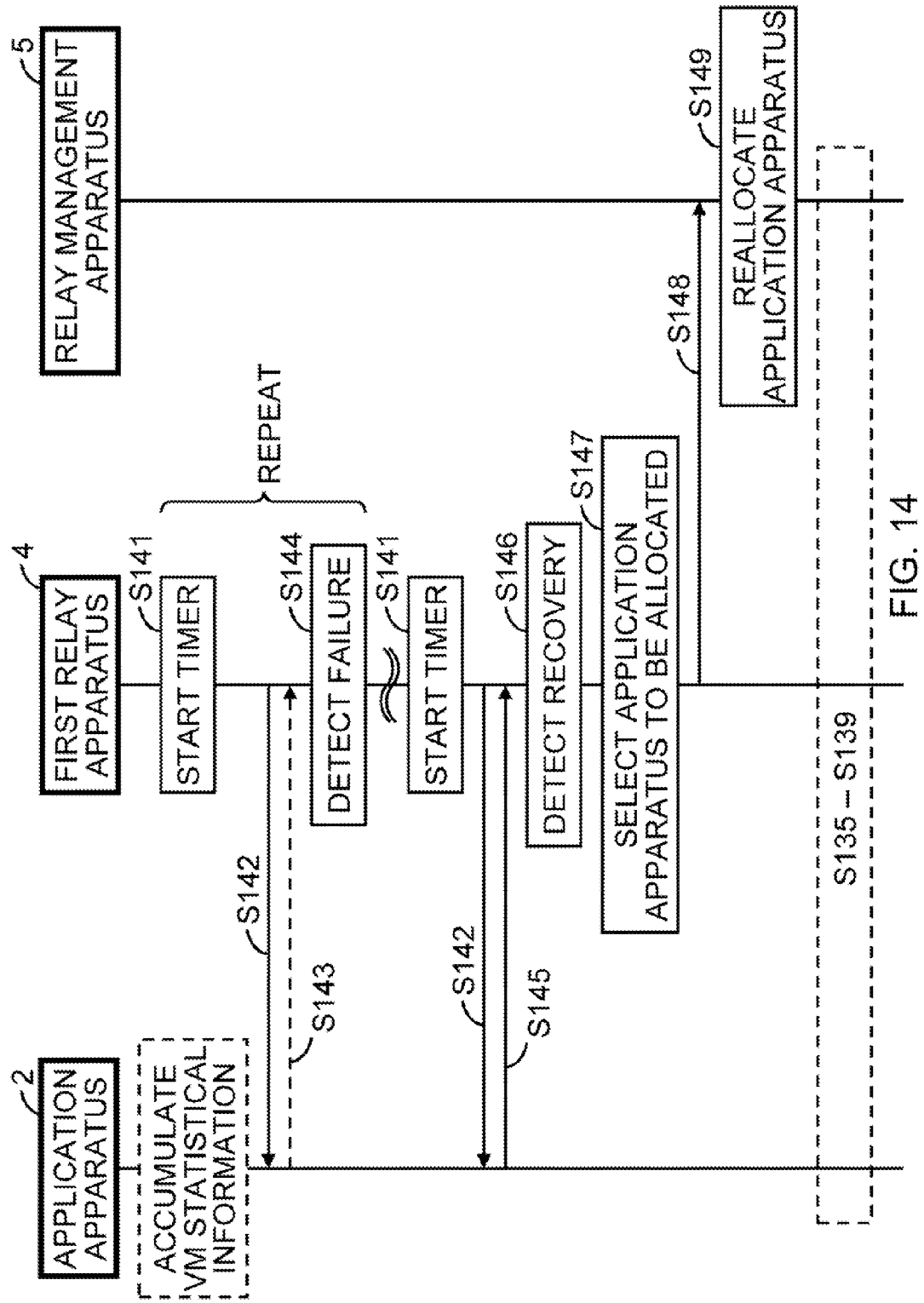
FIG. 14 is a diagram illustrating an exemplary process for reallocating an application apparatus according to an embodiment of the present invention.

FIG. 14 illustrates an exemplary process for reallocating the application apparatus 2 according to the present embodiment. Referring to FIG. 14, an exemplary process for reallocating an application apparatus 2 allocated to a present relay apparatus 4 to another relay apparatus 4 will be discussed as in a case in which the present relay apparatus 4 fails to receive the VM statistical information from the application apparatus 2 in the process for periodically collecting VM statistical information illustrated in FIG. 12 discussed above. It is assumed that the application apparatus 2 continues to extract and accumulate VM statistical information, however, the present relay apparatus 4 fails to receive the VM statistical information from the application apparatus 2 owing to a communication failure or the like between the application apparatus 2 and the present relay apparatus 4. Such a failure may be detected, for example, when the present relay apparatus 4 fails to receive from the application apparatus 2 a communication response indicating receipt of a request, transmitted from the present relay apparatus 4 to the application apparatus 2, for operational statuses. The reallocation of the application apparatus 2 at the time of a failure is performed to reallocate the application apparatus 2 to another relay apparatus 4 in preparation for an increase in the load of the present relay apparatus 4 due to transmission of all the operational information accumulated in the application apparatus 2 during the failure to the present relay apparatus 4 at recovery from the failure.

In S141, the first relay apparatus 4 starts a timer every predetermined period of time.

In S142, the first relay apparatus 4 transmits a request for VM statistical information to the application apparatus 2.

In S143, the first relay apparatus 4 fails to receive the VM statistical information from the application apparatus 2.

In S144, the first relay apparatus 4 determines that a failure has occurred between the application apparatus 2 and the first relay apparatus 4.

The first relay apparatus 4 repeats S141 to S144 every predetermined period of time.

In S145, the first relay apparatus 4 receives the VM statistical information from the application apparatus 2 in response to the request (in S142) for the VM statistical information.

In S146, the first relay apparatus 4 detects recovery from the failure between the application apparatus 2 and the first relay apparatus 4.

In S147, while receiving the VM statistical information from the application apparatus 2, the first relay apparatus 4 selects an application apparatus 2 to be reallocated to another relay apparatus 4 from among the application apparatuses 2, relay process for which has been allocated to the first relay apparatus 4.

In S148, the first relay apparatus 4 transmits to the relay management apparatus 5 a request to reallocate the selected application apparatus 2 to another relay apparatus 4.

In S149, upon receipt of the request from the first relay apparatus 4, the relay management apparatus 5 selects a second relay apparatus 4 to which the application apparatus 2 will be reallocated, and reallocates the application apparatus 2 to the selected second relay apparatus 4.

Thereafter, operations similar to S135 to S139 are performed and the discussion thereof is omitted.

Figure 15:
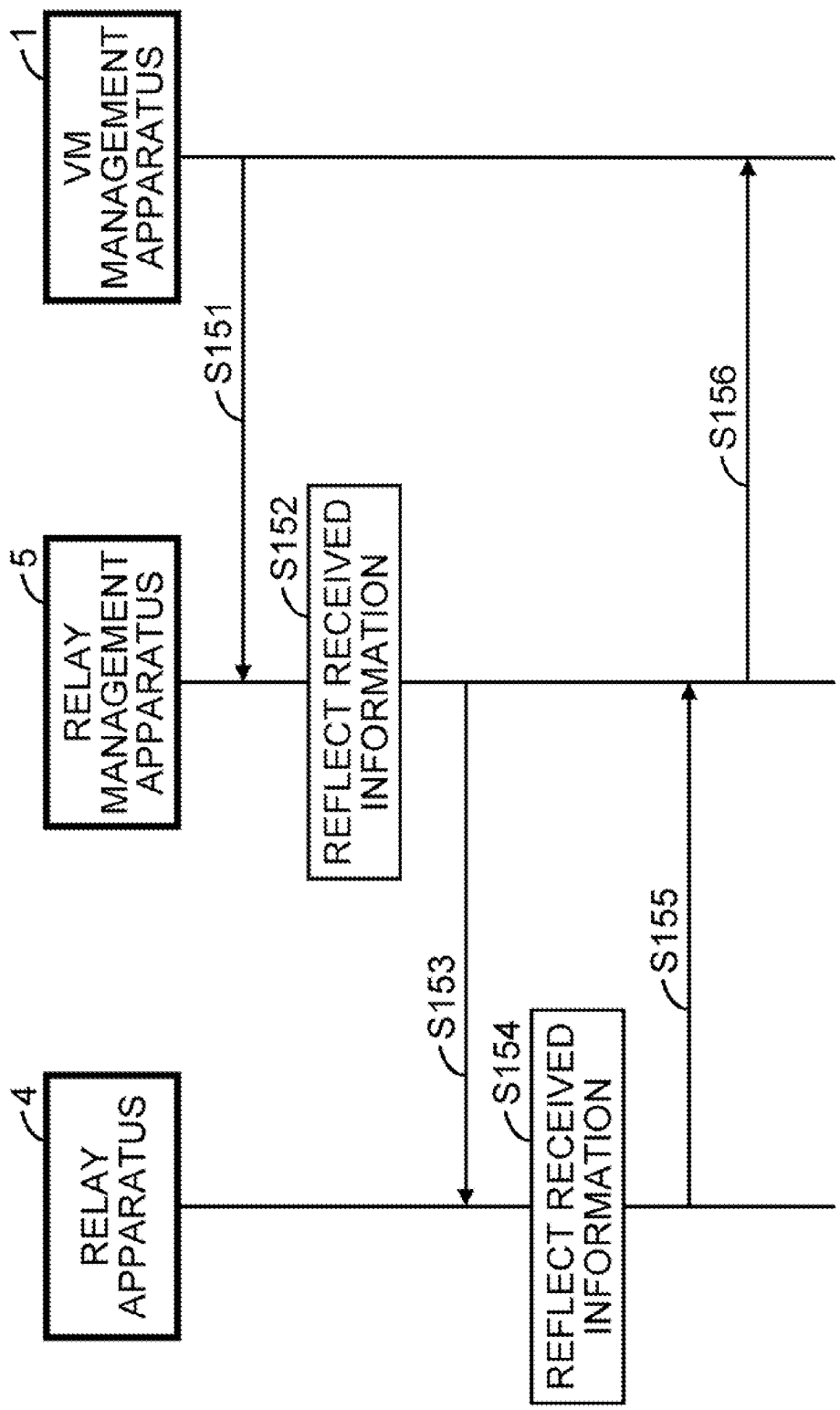
FIG. 15 is a diagram illustrating an exemplary process upon notification of system configuration information from a VM management apparatus according to an embodiment of the present invention.

FIG. 15 illustrates an exemplary process upon the VM management apparatus 1 notifying of system configuration information related to relay process for VM statistical information. The VM management apparatus 1 transmits notification of the system configuration information, for example, when a VM is newly created or deleted in an application apparatus 2 or migrated to another application apparatus 2 owing to addition or deletion of an application apparatus 2, or when a collection apparatus 3 is added or deleted.

In S151, the VM management apparatus 1 transmits system configuration information to the relay management apparatus 5.

In S152, upon receipt of the system configuration information, the relay management apparatus 5 reflects the received system configuration information in various types of information stored in the relay management apparatus 5.

In S153, the relay management apparatus 5 transmits the system configuration information to a relay apparatus 4 to which relay process related to the system configuration information is allocated.

In S154, the relay apparatus 4 reflects the received system configuration information in various types of information stored therein.

In S155, the relay apparatus 4 responds to the relay management apparatus 5 with a response message indicating that the reflection process has been completed.

In S156, the relay management apparatus 5 responds to the VM management apparatus 1 with a response message indicating that the reflection process has been completed.

Next, operations of the components included in a relay apparatus 4 will be discussed in detail.

Figure 16:
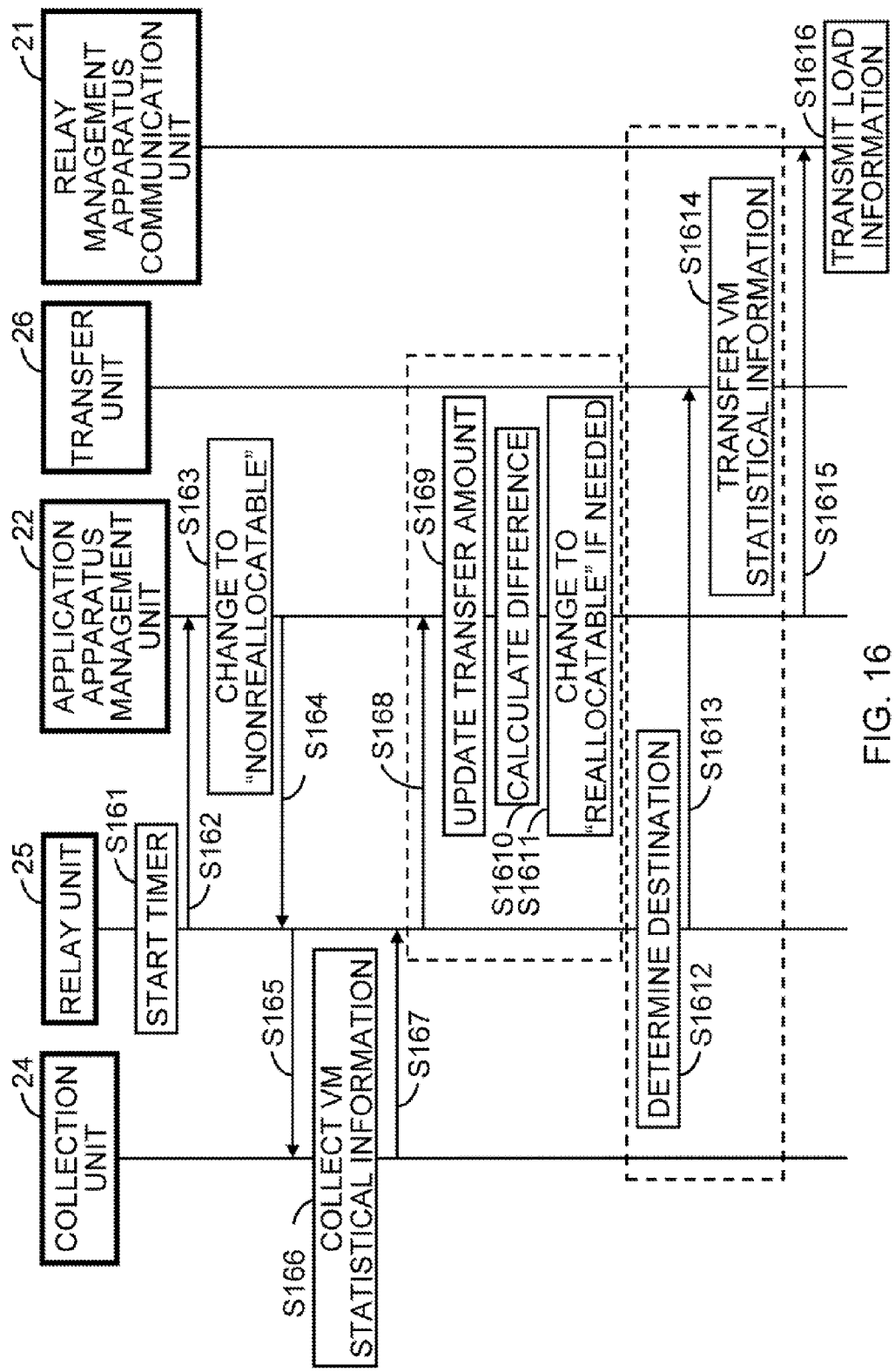
FIG. 16 is a diagram illustrating an exemplary periodical collection process within a relay apparatus according to an embodiment of the present invention.

FIG. 16 illustrates an exemplary periodical process for collecting VM statistical information performed in the relay apparatus 4.

In S161, the relay unit 25 starts a timer every predetermined period of time.

In S162, the relay unit 25 transmits the application apparatus management unit 22 a request for an IP address of an application apparatus 2 whose VM statistical information is collected.

In S163, the application apparatus management unit 22 changes the reallocation status in a record, of the application apparatus management table 11, corresponding to the application apparatus 2 to "nonreallocatable" (inappropriate to be reallocated). S163 is a process for changing (storing in the storage unit) the reallocation status of the application apparatus 2 whose VM statistical information has started to be collected, in other words, a process for changing the reallocation status of the application apparatus 2 in accordance with a status of receiving VM statistical information from the application apparatus 2. Such a process has the following meaning. That is, when an application apparatus 2 is to be selected for reallocation to another relay apparatus 4 during the course of collecting VM statistical information, if an application apparatus 2 whose VM statistical information is being received by some relay apparatus 4 is selected as an apparatus to be reallocated and reallocation process is performed, the process for collecting VM statistical information may be interrupted. The relay apparatus 4 to which the application apparatus 2 is reallocated needs to collect the VM statistical information from the beginning, resulting in extra relay processes. When the reallocation status of the application apparatus 2 whose VM statistical information is to be collected is set to "nonreallocatable", it may be understood that the application apparatus 2 is inappropriate to be selected as an apparatus to be reallocated. Hence, the application apparatus 2 is not selected for reallocation to another relay apparatus 4 (refer to S173 in FIG. 17, discussed later). As a result, the extra relay processes discussed above may be prevented.

In S164, the application apparatus management unit 22, with reference to the application apparatus management table 11, acquires the IP address of the application apparatus 2 and transmits the acquired IP address to the relay unit 25.

In S165, the relay unit 25 transmits an instruction to collect VM statistical information from the application apparatus 2 together with the IP address of the application apparatus 2 to the collection unit 24.

In S166, the collection unit 24 transmits a request for VM statistical information to the application apparatus 2 using the IP address received from the relay unit 25, and receives VM statistical information for each VM from the application apparatus 2. This VM statistical information includes a VM identifier.

In S167, the collection unit 24 determines the amount of data (i.e., transfer amount) of the VM statistical information received from the application apparatus 2, and transmits the VM statistical information and the transfer amount thereof to the relay unit 25 to request to relay the VM statistical information. When the application apparatus 2 has a plurality of VMs created therein and the collection unit 24 has received a plurality of pieces of VM statistical information, the collection unit 24 determines the total transfer amount of all the pieces of VM statistical information in S167.

In S168, the relay unit 25 transmits the transfer amount received from the collection unit 24 to the application apparatus management unit 22. Note that the collection unit 24 may directly transmit the transfer amount to the application apparatus management unit 22.

In S169, the application apparatus management unit 22 replaces the second-to-last transfer amount with the last transfer amount of a record, of the application apparatus management table 11, corresponding to the application apparatus 2, and then replaces the last transfer amount with the transfer amount received from the relay unit 25.

In S1610, the application apparatus management unit 22 calculates the difference between the last transfer amount and the second-to-last transfer amount.

In S1611, when the calculated difference is below or equal to the transfer amount variation threshold stored in the common information table 13, the application apparatus management unit 22 changes the reallocation status in the record, of the application apparatus management table 11, corresponding to the application apparatus 2 to "reallocatable" (appropriate to be reallocated). S1610 is a process for changing (storing in the storage unit) the reallocation status of the application apparatus 2 in accordance with the transfer amount of VM statistical information, in other words, a process for changing the reallocation status of the application apparatus 2 in accordance with a status of receiving VM statistical information from the application apparatus 2. Such a process has the following meaning. That is, when the difference between the second-to-last transfer amount and the last transfer amount is below or equal to the transfer amount variation threshold, this indicates that variation in the transfer amount of the VM statistical information transmitted by the application apparatus 2 is likely to be relatively small. Hence, even when the application apparatus 2 is reallocated to another relay apparatus 4, it is unlikely that the load due to relaying process becomes unstable in the relay apparatus 4 to which the application apparatuses 2 is reallocated. Accordingly, it may be determined that this application apparatus 2 is to be reallocated. On the other hand, when the difference between the second-to-last transfer amount and the last transfer amount exceeds the transfer amount variation threshold, the reallocation status is kept to be "nonreallocatable".

In S1612, the relay unit 25, with reference to the destination table 12, determines the IP address of the collection apparatus 3, which is the transfer destination of the VM statistical information, on the basis of the VM identifier contained in the received VM statistical information.

In S1613, the relay unit 25 transmits to the transfer unit 26 the determined IP address of the collection apparatus 3, which is the transfer destination, and a request to be transmitted to the collection apparatus 3 for the VM statistical information.

In S1614, upon receipt of the request from the relay unit 25, the transfer unit 26 transfers the VM statistical information to the collection apparatus 3 using the received IP address of the collection apparatus 3, which is the transfer destination.

Note that S162 to S1614 are executed for each application apparatus 2 allocated to the relay apparatus 4. Either of S168 to S1611 and S1612 to S1614 may be executed first, or both may be executed in parallel.

In S1615, the application apparatus management unit 22 generates load information regarding the relay apparatus 4 and transmits a request for transmission of the generated load information to the relay management apparatus communication unit 21. Specifically, the application apparatus management unit 22 determines the CPU utilization and large-variation CPU utilization of itself (relay apparatus 4). In addition, the application apparatus management unit 22 calculates, with reference to the application apparatus management table 11, a next transfer amount on the basis of the total last transfer amounts of all the application apparatuses 2 allocated to the relay apparatus 4. For an application apparatus 2 in which a value has been set to the number of acquisition failures, the next transfer amount is calculated using the last transfer amount multiplied by the number of acquisition failures, instead of the last transfer amount. The application apparatus management unit 22 transmits the load information including the CPU utilization, large-variation CPU utilization, and next transfer amount to the relay management apparatus communication unit 21.

In S1616, the relay management apparatus communication unit 21 transmits the load information to the relay management apparatus 5.

As discussed above, S1615 and S1616 for transmitting the load information may be performed every predetermined period of time as a separate process independent of the VM statistical information collection process.

Figure 17:
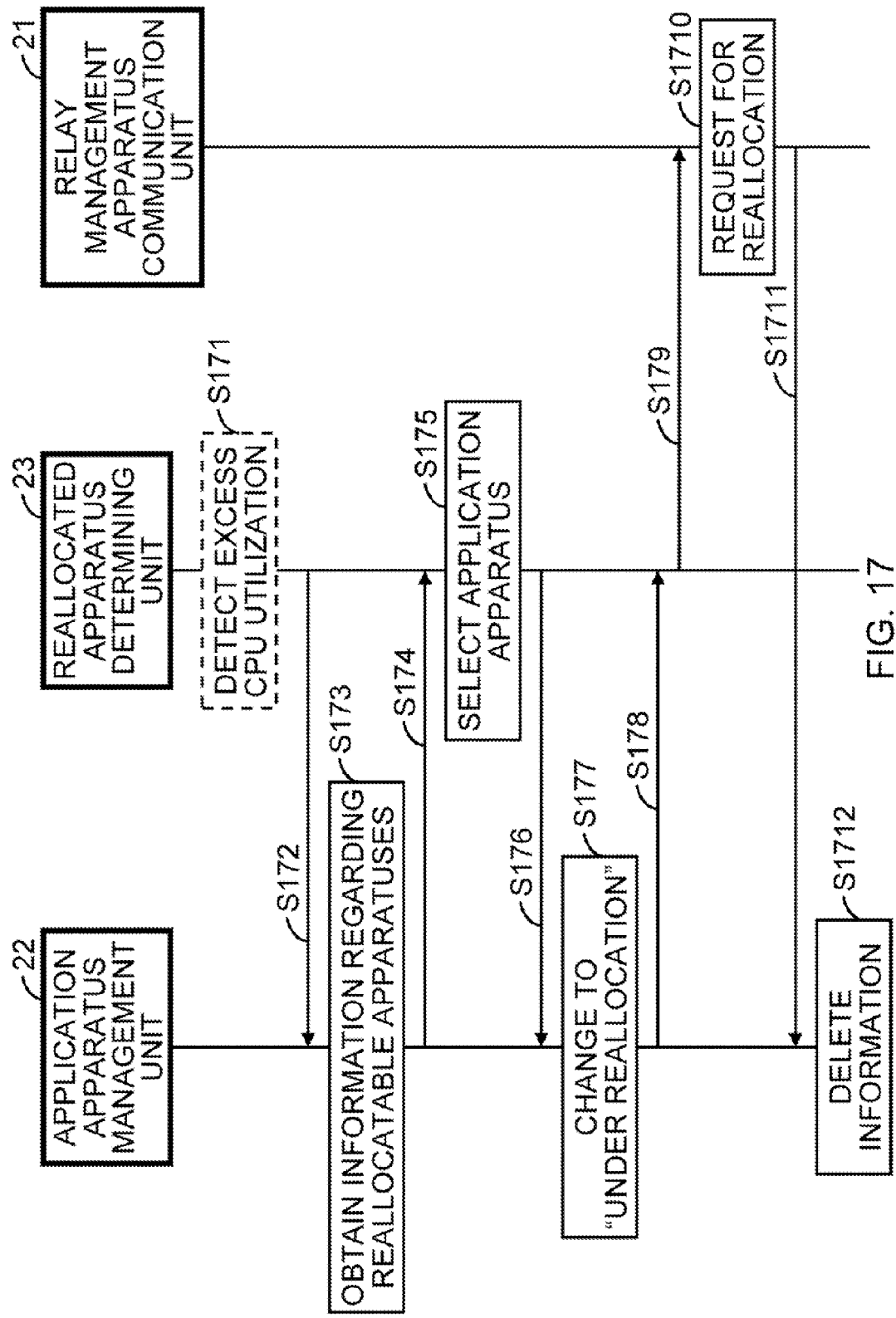
FIG. 17 is a diagram illustrating an exemplary process within a relay apparatus for reallocating an application apparatus according to an embodiment of the present invention.

FIG. 17 illustrates an exemplary process within a present relay apparatus 4 for reallocating an application apparatus 2 allocated to the present relay apparatus 4 to another relay apparatus 4 when the CPU utilization of the present relay apparatus 4 has exceeded the CPU utilization threshold.

In S171, the reallocated apparatus determining unit 23 detects that the CPU utilization of the present relay apparatus 4 has exceeded the CPU utilization threshold stored in the common information table 13.

In S172, the reallocated apparatus determining unit 23 transmits the application apparatus management unit 22 a request to notify the reallocated apparatus determining unit 23 of application apparatuses 2, among the application apparatuses 2 allocated to the present relay apparatus 4, which are reallocatable to another relay apparatus 4 and of the last transfer amounts of the application apparatuses 2.

In S173, upon receipt of the request from the reallocated apparatus determining unit 23, the application apparatus management unit 22 acquires, with reference to the application apparatus management table 11, the IP addresses and last transfer amounts of application apparatuses 2, among the application apparatuses 2 allocated to the present relay apparatus 4, whose reallocation statuses are "reallocatable". When there is no application apparatuses 2 whose reallocation status is "reallocatable", the application apparatus management unit 22 may display an error message.

In S174, the application apparatus management unit 22 transmits the acquired IP addresses and the last transfer amounts of the application apparatuses 2 to the reallocated apparatus determining unit 23.

In S175, the reallocated apparatus determining unit 23 selects as an apparatus to be reallocated an application apparatus 2 with the largest last transfer amount from among the application apparatuses 2 notified from the application apparatus management unit 22. By selecting an application apparatus 2 with the largest last transfer amount, the processing load of the present relay apparatus 4 maybe efficiently reduced owing to reallocation of the application apparatus 2. However, the selected application apparatus 2 may not necessarily be the one with the largest last transfer amount.

In S176, the reallocated apparatus determining unit 23 notifies the application apparatus management unit 22 of the selected application apparatus 2.

In S177, the application apparatus management unit 22 changes the reallocation status, for the selected application apparatus 2, of the application apparatus management table 11 to "under reallocation".

In S178, the application apparatus management unit 22 responds to the reallocated apparatus determining unit 23 with a response message indicating that the application apparatus management table 11 has been updated.

In S179, upon receipt of this response, the reallocated apparatus determining unit 23 transmits to the relay management apparatus communication unit 21 a request for reallocating the application apparatus 2 to be reallocated together with the IP address thereof.

In S1710, the relay management apparatus communication unit 21 transmits to the relay management apparatus 5 a request for reallocating the application apparatus 2.

In S1711, upon receipt of a response message indicating that reallocation has been completed from the relay management apparatus 5, the relay management apparatus communication unit 21 responds to the application apparatus management unit 22 with a response message indicating that reallocation has been completed.

In S1712, upon receipt of the response from the management apparatus communication unit 21, the application apparatus management unit 22 deleted the record regarding the application apparatus 2 to be reallocated from the application apparatus management table 11.

Figure 18:
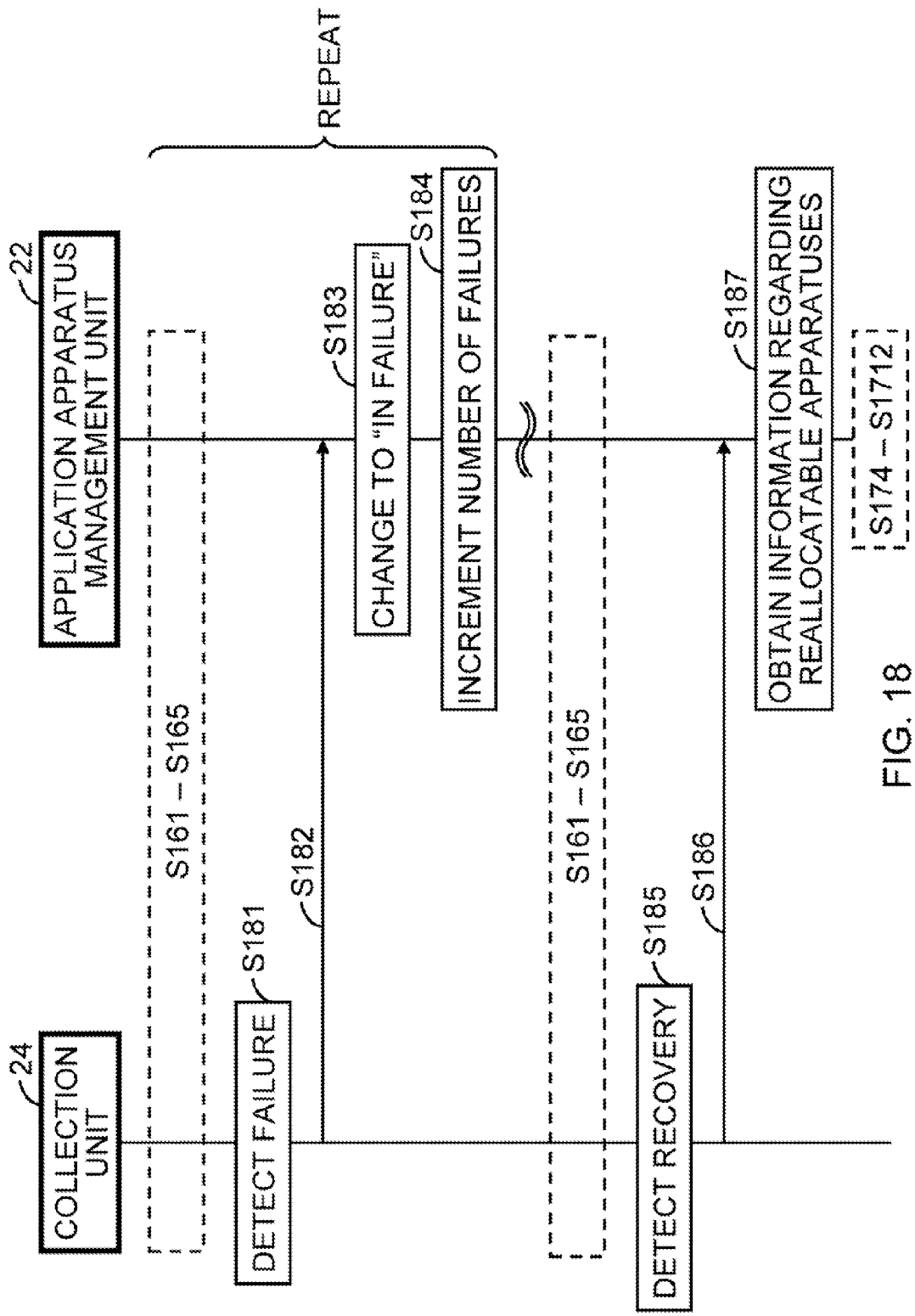
FIG. 18 is a diagram illustrating an exemplary process within a relay apparatus for reallocating an application apparatus according to an embodiment of the present invention.

FIG. 18 illustrates an exemplary process within a present relay apparatus 4 for reallocating an application apparatus 2 allocated to the present relay apparatus 4 to another relay apparatus 4 when the present relay apparatus 4 fails to receive the VM statistical information from the application apparatus 2 in the periodical process for collecting VM statistical information illustrated in FIG. 16.

After operations similar to S161 to S165, the collection unit 24 tries to collect VM statistical information.

In S181, the collection unit 24 fails to receive the VM statistical information, and thereby detects that a failure has occurred.

In S182, the collection unit 24 notifies the application apparatus management unit 22 of the detection of failure occurrence.

In S183, upon receipt of the notification from the collection unit 24, the application apparatus management unit 22 changes the reallocation status in a record, of the application apparatus management table 11, corresponding to the application apparatus 2 for which collection of VM statistical information has failed to "in failure". S183 is a process for changing (storing in the storage unit) the reallocation status of the application apparatus 2 from which the collection unit 24 has failed to receive the VM statistical information, in other words, a process for changing the reallocation status of the application apparatus 2 in accordance with a status of receiving the VM statistical information from the application apparatus 2. Such a process has the following meaning. That is, by setting the reallocation status of the application apparatus 2 to "in failure", it may be understood that the application apparatus 2 is inappropriate to be selected as an apparatus to be reallocated, that is, nonreallocatable. Hence, the application apparatus 2 is prevented from being selected for reallocation to another relay apparatus 4 (refer to S187, discussed later).

In S184, the application apparatus management unit 22 increments the number of acquisition failures stored in the application apparatus management table 11 by one.

The present relay apparatus 4 repeats operations up to S184 until the present relay apparatus 4 detects recovery from the failure.

After operations similar to S161 to S165, the collection unit 24 tries to collect VM statistical information.

In S185, the collection unit 24 detects recovery from the failure as a result of again becoming able to receive VM statistical information from the application apparatus 2.

In S186, while continuing to receive VM statistical information, the collection unit 24 notifies the application apparatus management unit 22 of recovery from the failure.

In S187, upon receipt of the notification, the application apparatus management unit 22 starts reallocation of the application apparatus 2. Specifically, the application apparatus management unit 22 acquires, with reference to the application apparatus management table 11, the IP addresses and last transfer amounts of application apparatuses 2, among the application apparatuses 2 allocated to the present relay apparatus 4, whose reallocation statuses are "reallocatable". Reallocation of the application apparatus 2 has the following meaning as has been discussed with reference to FIG. 14. That is, in preparation for an increase in the load of the present relay apparatus 4 due to transmission of all the operational information accumulated during the failure on the application apparatus 2 to the present relay apparatus 4 at recovery from the failure, another application apparatus 2 allocated to the present relay apparatus 4 is reallocated to another relay apparatus 4. Then, the relay apparatus 4 performs operations similar to S174 to S1712.

FIG. 19 illustrates an exemplary process within a relay apparatus 4 to which an application apparatus 2 has been newly allocated through reallocation of the application apparatus 2.

In S191, the relay management apparatus communication unit 21 receives from the relay management apparatus 5 a notification message indicating that the application apparatus 2 has been newly allocated together with the IP address of the application apparatus 2.

In S192, upon receipt of this notification, the relay management apparatus communication unit 21 transmits the IP address of the newly allocated application apparatus 2 to the application apparatus management unit 22.

In S193, upon receipt of the IP address of the application apparatus 2, the application apparatus management unit 22 adds a record corresponding to the application apparatus 2 to the application apparatus management table 11.

In S194, the application apparatus management unit 22 responds to the relay management apparatus communication unit 21 with a response message indicating that the addition has been completed.

In S195, upon receipt of this response, the relay management apparatus communication unit 21 responds to the relay management apparatus 5 with a response message indicating that addition process of registering the application apparatus in the relay apparatuses 4 has been completed.

Update of the information held in the relay apparatus 4 is performed similarly to the process illustrated in FIG. 19 not only when an application apparatus 2 is reallocated but also, for example, when various types of system configuration information are received from the relay management apparatus 5. For example, when there is a change in the collection apparatus 3 to which the VM statistical information of a VM running on the application apparatuses 2 allocated to the relay apparatus 4 is transmitted, the relay apparatus 4 performs the following process. That is, upon receipt of a change notification, from the relay management apparatus 5, that includes the VM identifier and the IP address of a collection apparatus 3 after the change, the relay apparatus 4 changes the IP address, stored in the destination table 12, of the collection apparatus 3 corresponding to the VM identifier included in the received change notification to the IP address of the collection apparatus 3 included in the received change notification.

According to the present embodiment, when an application apparatus 2 is reallocated to another relay apparatus 4, the application apparatus management unit 22 changes the reallocation status stored in the application apparatus management table 11 on the basis of a status of receiving VM statistical information from the application apparatuses 2. Hence, the reallocated apparatus determining unit 23 determines an application apparatus 2 on the basis of the reallocation statuses of the application apparatuses 2. Thus, the reallocated apparatus determining unit 23 may select an appropriate application apparatus 2 to be reallocated by considering the statuses of the application apparatuses 2.

As an example, as discussed above, when starting to collect VM statistical information of an application apparatus 2, the application apparatus management unit 22 changes the reallocation status of the application apparatus 2 to "nonreallocatable". When the collection of the VM statistical information is finished, the application apparatus management unit 22 changes the reallocation status of the application apparatus 2 back to "reallocatable". Accordingly, VM statistical information collection process is prevented from being interrupted as a result of selecting the application apparatus 2, which is performing the VM statistical information collection process, as an apparatus to be reallocated. As a result, the extra relay processes in which the VM statistical information is again collected from the beginning may be prevented in the relay apparatus 4 to which the application apparatus 2 is reallocated.

When the difference between the last and the second-to-last transfer amounts of the VM statistical information exceeds the transfer amount variation threshold, the application apparatus management unit 22 keeps the reallocation status as "nonreallocatable". Hence, an application apparatus 2 with a large variation in the transfer amount of VM statistical information, in other words, an application apparatus 2 that requires a relay processing load with a large variation in the relay apparatus 4, is prevented from being selected as an application apparatus 2 to be reallocated. Hence, in the relay apparatus 4 to which the application apparatus 2 has been reallocated, it becomes unlikely that the variation in the load becomes unexpectedly large and a burden is placed on the resources of the relay apparatus 4. Therefore, the processing efficiency of the relay apparatus 4 may not decrease. In other words, the application apparatus 2 that enables stable relay process may be reallocated, i.e., such an application apparatus 2 may be reallocated that, even when reallocated, is unlikely to cause trouble in the operation of the relay apparatus 4 to which the application apparatus 2 is reallocated. As a result, reallocation may be more effective.

According to the present embodiment, when a failure occurs in acquiring VM statistical information from an application apparatus 2, the application apparatus management unit 22 changes the reallocation status of the application apparatus 2 to "in failure". Hence, the application apparatus 2 is prevented from being selected for reallocation during the failure.

The relay apparatus 4, not only when the CPU processing load is high but also when recovery from a failure occurs during acquiring VM statistical information from an application apparatus 2, transmits to the relay management apparatus 5 a request to reallocate the application apparatus 2 to another relay apparatus 4. Thereby, in preparation for an increase in the load of the present relay apparatus 4 due to transmission of all the operational information accumulated during the failure on the application apparatus 2 to the present relay apparatus 4 at recovery from the failure, another application apparatus 2 allocated to the present relay apparatus 4 is reallocated to another relay apparatus 4. Consequently, it becomes unlikely that the processing load of the present relay apparatus 4 increases and causes a delay in processing.

As a result, from the viewpoint of a system as a whole, information processing resources of the plurality of relay apparatuses 4 are effectively utilized and data relay processes may be efficiently performed.

Next, operations of the components included in the relay management apparatus 5 will be discussed in detail.

FIG. 20 illustrates an exemplary process performed in the relay management apparatus 5 when load information is periodically received from a relay apparatus 4.

In S201, the relay apparatus communication unit 42 receives load information from the relay apparatus 4.

In S202, the relay apparatus communication unit 42 transmits the received load information to the relay apparatus management unit 43.

In S203, the relay apparatus management unit 43 updates the relay apparatus management table 31 so that the received load information is reflected in the relay apparatus management table 31.

In S204, the relay apparatus management unit 43 responds to the relay apparatus communication unit 42 with a response message indicating that the load information has been updated.

In S205, the relay apparatus communication unit 42 transmits to the relay apparatus 4 which transmitted the load information a response message indicating that the load information has been updated.

Figure 21:
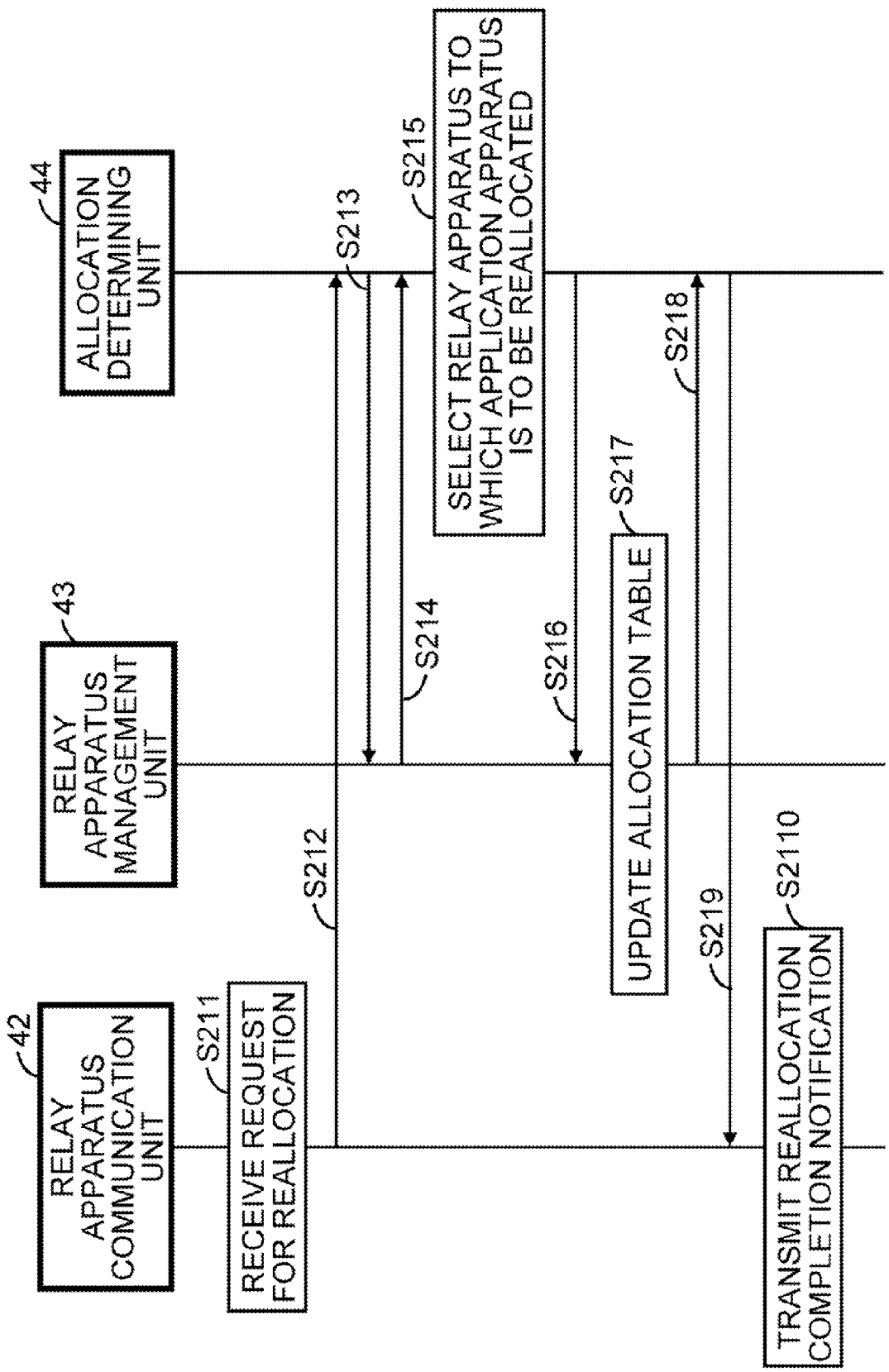
FIG. 21 is a diagram illustrating an exemplary process within a relay management apparatus according to an embodiment of the present invention.

FIG. 21 illustrates an exemplary process performed in the relay management apparatus 5 for reallocating an application apparatus 2 when a request for reallocating the application apparatus 2 has been received from a relay apparatus 4.

In S211, the relay apparatus communication unit 42 receives from the present relay apparatus 4 a request to reallocate an application apparatus 2 to another relay apparatus 4 and the IP address of the application apparatus 2.

In S212, the relay apparatus communication unit 42 notifies the allocation determining unit 44 of the received IP address of the application apparatus 2 and the IP address of the present relay apparatus 4 which transmitted the request.

In S213, the allocation determining unit 44 transmits to the relay apparatus management unit 43 a request for load information regarding relay apparatuses 4 other than the present relay apparatus 4 that has transmitted the request.

In S214, the relay apparatus management unit 43 acquires the load information regarding the relay apparatuses 4 with reference to the relay apparatus management table 31 and transmits the acquired load information to the allocation determining unit 44.

In S215, the allocation determining unit 44 selects a relay apparatus 4 to which the application apparatus 2 is to be reallocated on the basis of the load information regarding the relay apparatuses 4 received from the relay apparatus management unit 43. The details of this selection process will be discussed later.

In S216, the allocation determining unit 44 notifies the relay apparatus management unit 43 of the IP address of the selected relay apparatus 4 to which the application apparatus 2 is to be reallocated.

In S217, the relay apparatus management unit 43 updates the allocation table 32 on the basis of the notification of the IP address of the relay apparatus 4 received from the allocation determining unit 44. Specifically, the relay apparatus management unit 43 replaces the IP address of the relay apparatus 4 corresponding to the IP address of the application apparatus 2 to be reallocated with the IP address of the relay apparatus 4 selected by the allocation determining unit 44.

In S218, the relay apparatus management unit 43 responds to the allocation determining unit 44 with a response message indicating that the update has been completed.

In S219, the allocation determining unit 44 notifies the relay apparatus communication unit 42 of the IP address of the relay apparatus 4 selected by the allocation determining unit 44 and responds to the relay apparatus communication unit 42 with a response message indicating that reallocation of the application apparatus 2 has been completed.

In S2110, the relay apparatus communication unit 42 responds to the present relay apparatus 4 from which the application apparatus 2 has been reallocated with a response message indicating that reallocation of the application apparatus 2 has been completed, and notifies the relay apparatus 4 to which the application apparatus 2 has been reallocated of a notification message indicating that relay process for the application apparatus 2 has been completed, using the IP address of the relay apparatus 4 received from the allocation determining unit 44.

Figure 22:
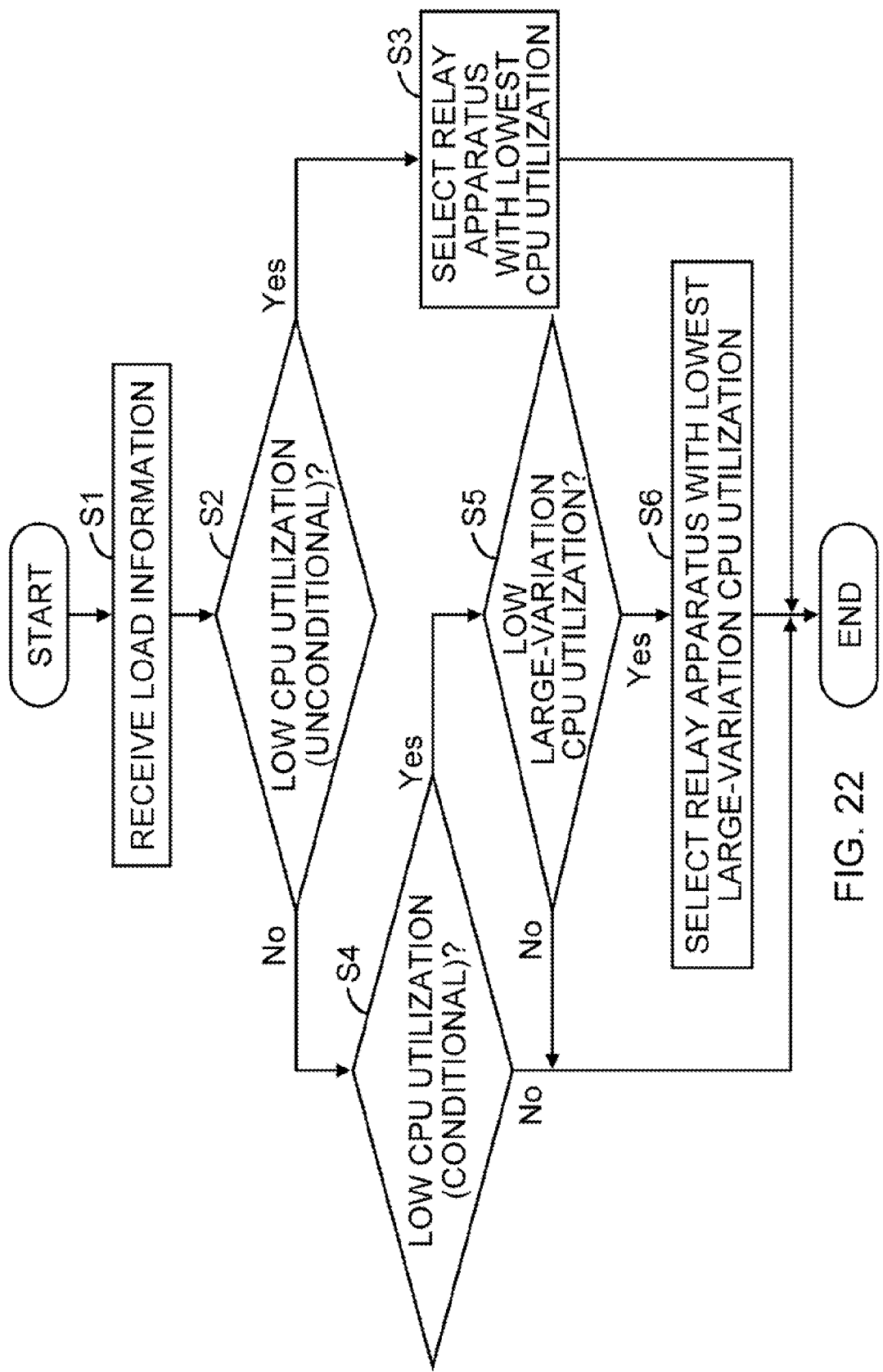
FIG. 22 is a diagram illustrating an exemplary operation flow of a relay management apparatus according to an embodiment of the present invention.

FIG. 22 illustrates an exemplary operation flow of the allocation determining unit 44 of the relay management apparatus 5 for selecting a relay apparatus 4 to which the application apparatus 2 is to be reallocated, which corresponds to S214 to S215 illustrated in FIG. 21 discussed above.

In S1, the allocation determining unit 44 receives from the relay apparatus management unit 43 load information that includes the CPU utilizations, large-variation CPU utilizations, and next transfer amounts of relay apparatuses 4 other than the present relay apparatus 4 which has sent the request for reallocating the application apparatus 2.

In S2, the allocation determining unit 44 determines whether there are any relay apparatuses 4 with a CPU utilization below or equal to the CPU utilization unconditional allocation threshold stored in the common information table 34.

In S3, when there are relay apparatuses 4 with a CPU utilization below or equal to the CPU utilization unconditional allocation threshold ("Yes" in S2), the allocation determining unit 44 selects the relay apparatus 4 with the lowest CPU utilization from among them. The main objective of S3 is to allocate a relay process to a new relay apparatus 4 by priority when the new relay apparatus has been introduced.

In S4, when there is no relay apparatus 4 with a CPU utilization below or equal to the CPU utilization unconditional allocation threshold ("No" in S2), the allocation determining unit 44, further determines whether there are any relay apparatuses 4 with a CPU utilization below or equal to the CPU utilization conditional allocation threshold stored in the common information table 34.

In S5, when there are relay apparatuses 4 with a CPU utilization below or equal to the CPU utilization conditional allocation threshold ("Yes" in S4), the allocation determining unit 44 further determines whether there are any relay apparatuses 4 with a large-variation CPU utilization below or equal to the large-variation CPU utilization threshold stored in the common information table 34.

In S6, when there are relay apparatuses 4 with a large-variation CPU utilization below or equal to large-variation CPU utilization threshold ("Yes" in S5), the allocation determining unit 44 selects a relay apparatus 4 with the lowest large-variation CPU utilization from among them. Owing to S6, a relay apparatus 4 which performs less processes with a large variation in the transfer amount, i.e., a relay apparatus 4 operating relatively stably may be selected. Hence, it becomes unlikely that the operation of the relay apparatus 4 to which the application apparatus 2 is reallocated becomes unstable.

When there is no relay apparatuses 4 with a CPU utilization below or equal to the CPU utilization threshold ("No" in S4), the allocation determining unit 44 terminates the process without selecting any relay apparatus 4. Thereby, when there are only relay apparatuses 4 with a high CPU utilization, reallocation of the application apparatus 2 may be prevented from being performed. Similarly, when there is no relay apparatuses 4 with a large-variation CPU utilization below or equal to the large-variation CPU utilization threshold ("No" in S5), the allocation determining unit 44 also terminates the process without selecting any relay apparatus 4. Thereby, even when there are relay apparatuses 4 with a relatively low CPU utilization, reallocation of the application apparatus 2 may be prevented from being performed when there are only relay apparatuses 4 operating unstably (i.e., when there are only relay apparatuses 4 whose CPU utilizations are likely to suddenly increase). An error message may be output when the process is terminated without selecting any relay apparatus 4 as discussed above.

The allocation determining unit 44 may determine a relay apparatus 4 to which the application apparatus 2 is to be reallocated not in consideration of the CPU utilization of the relay apparatuses 4 but in consideration of the next transfer amount. Specifically, the allocation determining unit 44 may select a relay apparatus 4 with the smallest next transfer amount, for example. Selecting the relay apparatus 4 in this manner has the following advantage. That is, it may prevent selection of a relay apparatus 4 which seems to have a small CPU utilization at a glance, but which, owing to a failure occurring between the relay apparatus 4 and the application apparatus 2 allocated thereto, will cause transmission of all the VM statistical information accumulated during the failure after recovery from the failure. Further, the allocation determining unit 44 may select a relay apparatus 4 in consideration of both the CPU utilization and the next transfer amount.

Not limited to reallocation of an application apparatus 2, the relay management apparatus 5 may perform the process discussed above for allocation of a new application apparatus 2 to a relay apparatus 4. For example, in the case in which the relay management apparatus 5 receives, from the VM management apparatus 1, system configuration information indicating that a new application apparatus 2 has been added, the relay management apparatus 5 may determine a relay apparatus 4 to which the new application apparatus 2 is to be allocated similarly to the process discussed above. The relay management apparatus 5 updates the allocation table 32 so as to reflect the change, and notifies the determined relay apparatus 4 that the application apparatus 2 has been allocated to the determined relay apparatus 4. In addition, when an application apparatus 2 has been deleted from the system, for example, the relay management apparatus 5 also updates the allocation table 32 so as to reflect the change, and notifies the relay apparatus 4 to which the application apparatus 2 has been allocated of deletion of the application apparatus 2. Further, when the collection apparatus 3, to which the VM statistical information regarding the VM running on the application apparatus 2 allocated to the relay apparatus 4 is transferred, is changed, the relay management apparatus 5 updates the destination table 33 so as to reflect the change, and notifies the relay apparatus 4 to which the application apparatus 2 has been allocated of the change regarding the collection apparatus 3.

According to the present embodiment, in reallocation of an application apparatus 2, the present relay apparatus 4 may select an appropriate application apparatus 2 as a an apparatus to be reallocated, and the relay management apparatus 5 may select an appropriate relay apparatus 4 to which the application apparatus 2 is to be reallocated. Specifically, the relay management apparatus 5 periodically receives the load information of the relay apparatuses 4 and stores the received load information in the relay apparatus management table 31, thereby selecting a relay apparatus 4 to which an application apparatus 2 is to be reallocated on the basis of the load information. Here, the relay management apparatus 5, with reference not only to the CPU utilizations but also to the large-variation CPU utilizations of the relay apparatuses 4, selects a relay apparatus 4 with a large-variation CPU utilization lower than the large-variation CPU utilization threshold, and thereby may select a relay apparatus 4 operating relatively stably. In addition, as discussed above, when a relay apparatus 4 with a small next transfer amount is selected, selection of a relay apparatus 4 may be prevented which seems to have a small CPU utilization at a glance, but which is expected to cause transmission of all the VM statistical information accumulated during a failure in the future. Hence, in a relay apparatus 4 to which the application apparatus 2 is reallocated, it becomes more unlikely that the variation in the load becomes unexpectedly large and a burden is placed on the resources of the relay apparatus 4. Therefore, the processing efficiency of the relay apparatus 4 may not decrease.

Second Embodiment

In the first embodiment, a relay apparatus selects an application apparatus to be reallocated. However, the relay management apparatus may also select an application apparatus. In a second embodiment, discussion will be made of the case in which the relay management apparatus selects an application apparatus to be reallocated. Note that discussion of portions similar to those of the first embodiment is omitted.

Figure 30:
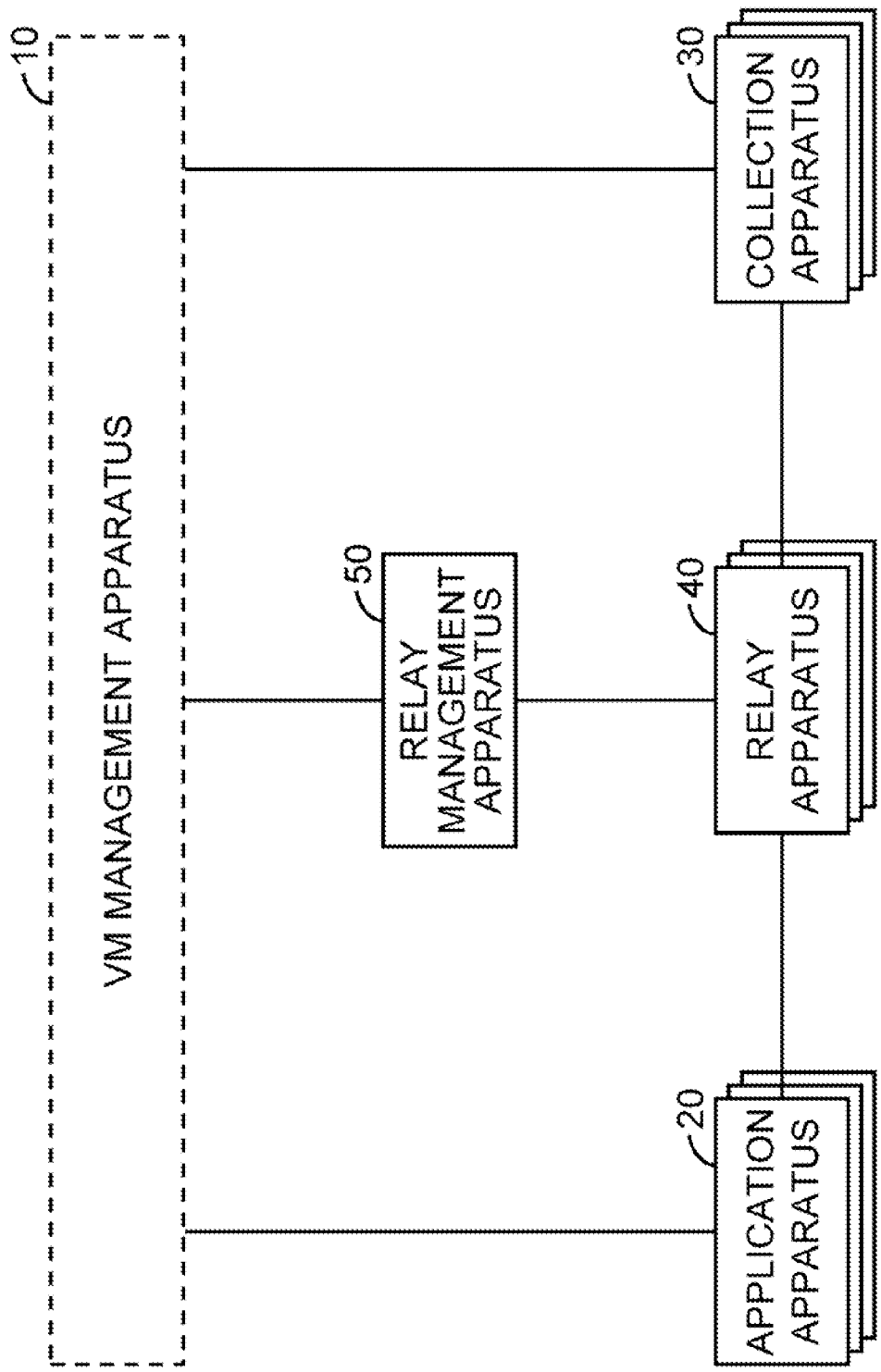
FIG. 30 is a diagram illustrating an exemplary entire configuration of a system according to an embodiment of the present invention.

FIG. 30 illustrates an exemplary entire configuration of a system according to the present embodiment. A system of the present embodiment has a configuration similar to that of the first embodiment, and includes a VM management apparatus 10, application apparatuses 20, collection apparatuses 30, relay apparatuses 40, and a relay management apparatus 50.

Figure 23:
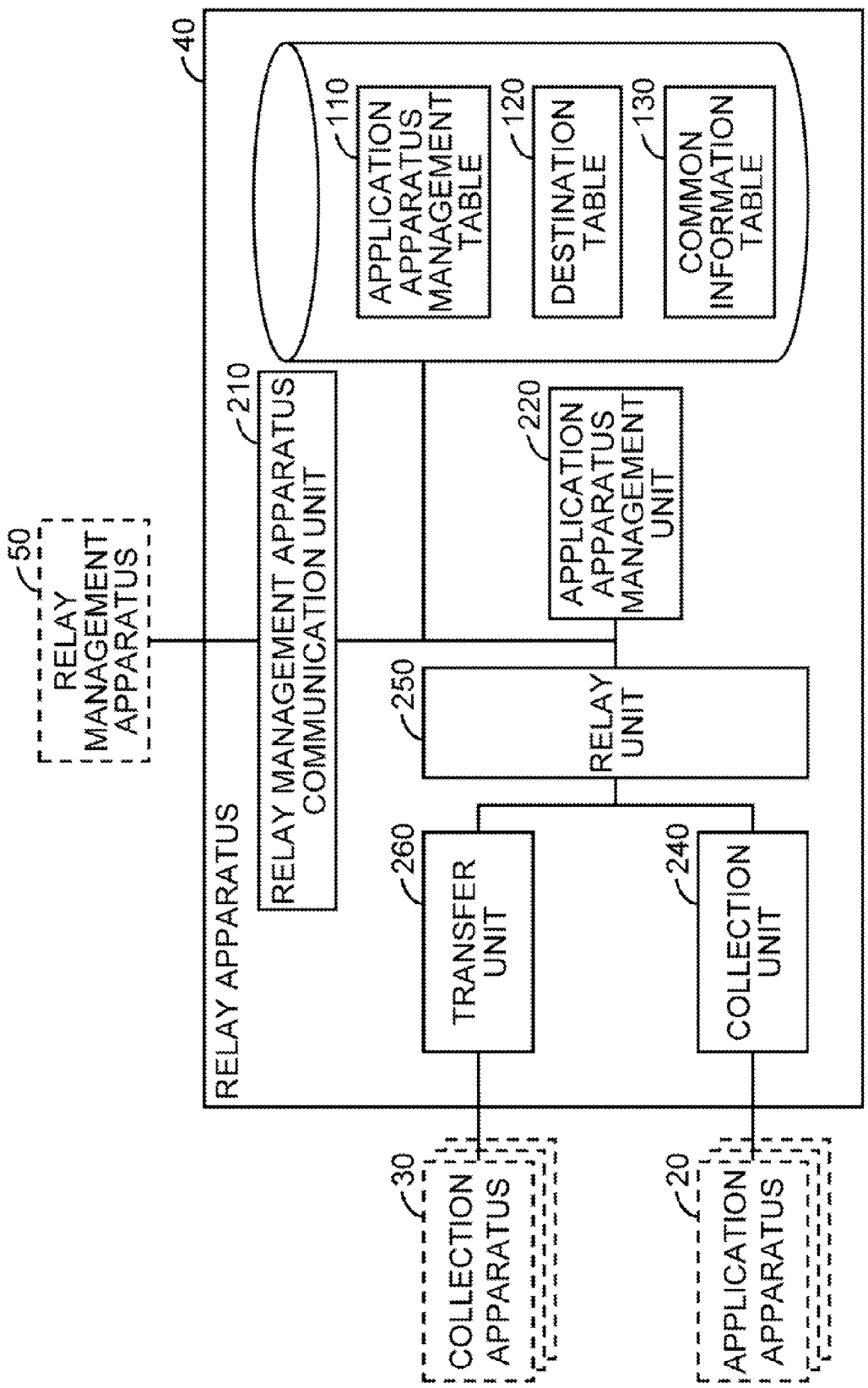
FIG. 23 is a diagram illustrating an exemplary functional configuration of a relay apparatus according to an embodiment of the present invention.

FIG. 23 illustrates an exemplary functional configuration of the relay apparatus 40 according to the present embodiment. The difference from the relay apparatus 4 of the first embodiment is that there is no reallocated apparatus determining unit in the present embodiment. An application apparatus management table 110, a destination table 120, a common information table 130, a relay management apparatus communication unit 210, an application apparatus management unit 220, a collection unit 240, a relay unit 250, and a transfer unit 260 illustrated in FIG. 23 respectively correspond to the application apparatus management table 11, the destination table 12, the common information table 13, the relay management apparatus communication unit 21, the application apparatus management unit 22, the collection unit 24, the relay unit 25, and the transfer unit 26 in the first embodiment, in principle. In addition to the function of the application apparatus management unit 22 discussed in the first embodiment, the application apparatus management unit 220 has a function of transmitting an updated content of the application apparatus management table 110 to the relay management apparatus 50 via the relay management apparatus communication unit 210 when the application apparatus management table 110 is updated.

Figure 24:
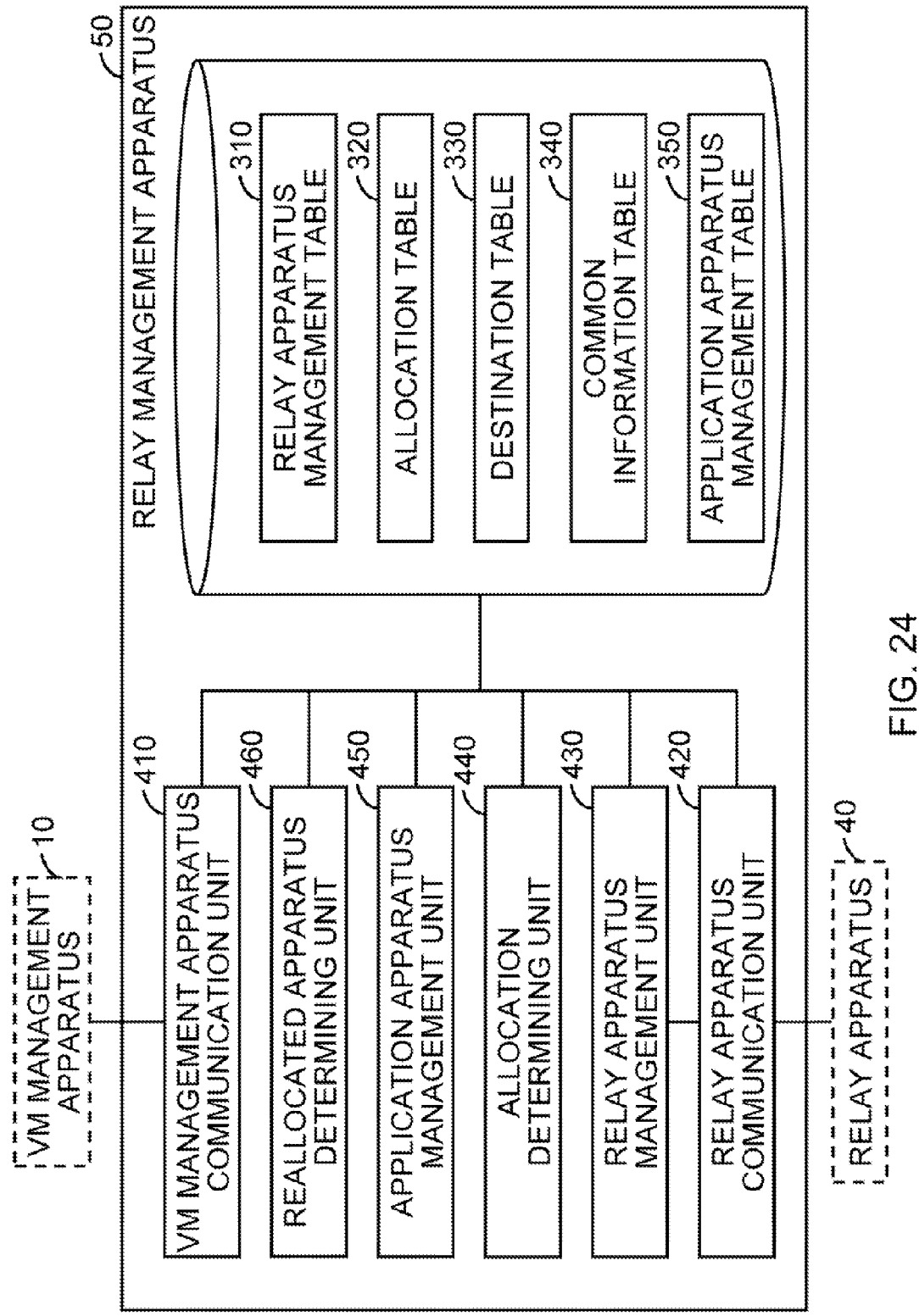
FIG. 24 is a diagram illustrating an exemplary functional configuration of a relay management apparatus according to an embodiment of the present invention.

FIG. 24 illustrates an exemplary functional configuration of the relay management apparatus 50 according to the present embodiment. The difference between the relay management apparatus 50 and the relay management apparatus 5 of the first embodiment is that the relay management apparatus 50 has an application apparatus management table 350, an application apparatus management unit 450, and a reallocated apparatus determining unit 460. A relay apparatus management table 310, an allocation table 320, a destination table 330, a common information table 340, a VM management apparatus communication unit 410, a relay apparatus communication unit 420, a relay apparatus management unit 430, and an allocation determining unit 440 respectively correspond to the relay apparatus management table 31, the allocation table 32, the destination table 33, the common information table 34, the VM management apparatus communication unit 41, the relay apparatus communication unit 42, the relay apparatus management unit 43, and the allocation determining unit 44 in the first embodiment, in principle.

The application apparatus management table 350 has a configuration similar to that of the application apparatus management table 11 of the first embodiment illustrated in FIG. 4. Unlike the application apparatus management table 11 of the first embodiment, the application apparatus management table 350 stores information regarding all of the application apparatuses 2 received from all of the relay apparatuses 4.

The reallocated apparatus determining unit 460 selects an application apparatuses 20 to be reallocated on the basis of the information stored in the application apparatus management table 350.

Unlike the first embodiment, the relay apparatus 40 transmits update information of the application apparatus management table 110 to the relay management apparatus 50. Such transmission is preferably performed every time the application apparatus management table 110 is updated. The relay management apparatus 50 updates the application apparatus management table 350 so as to reflect the update information.

Figure 25:
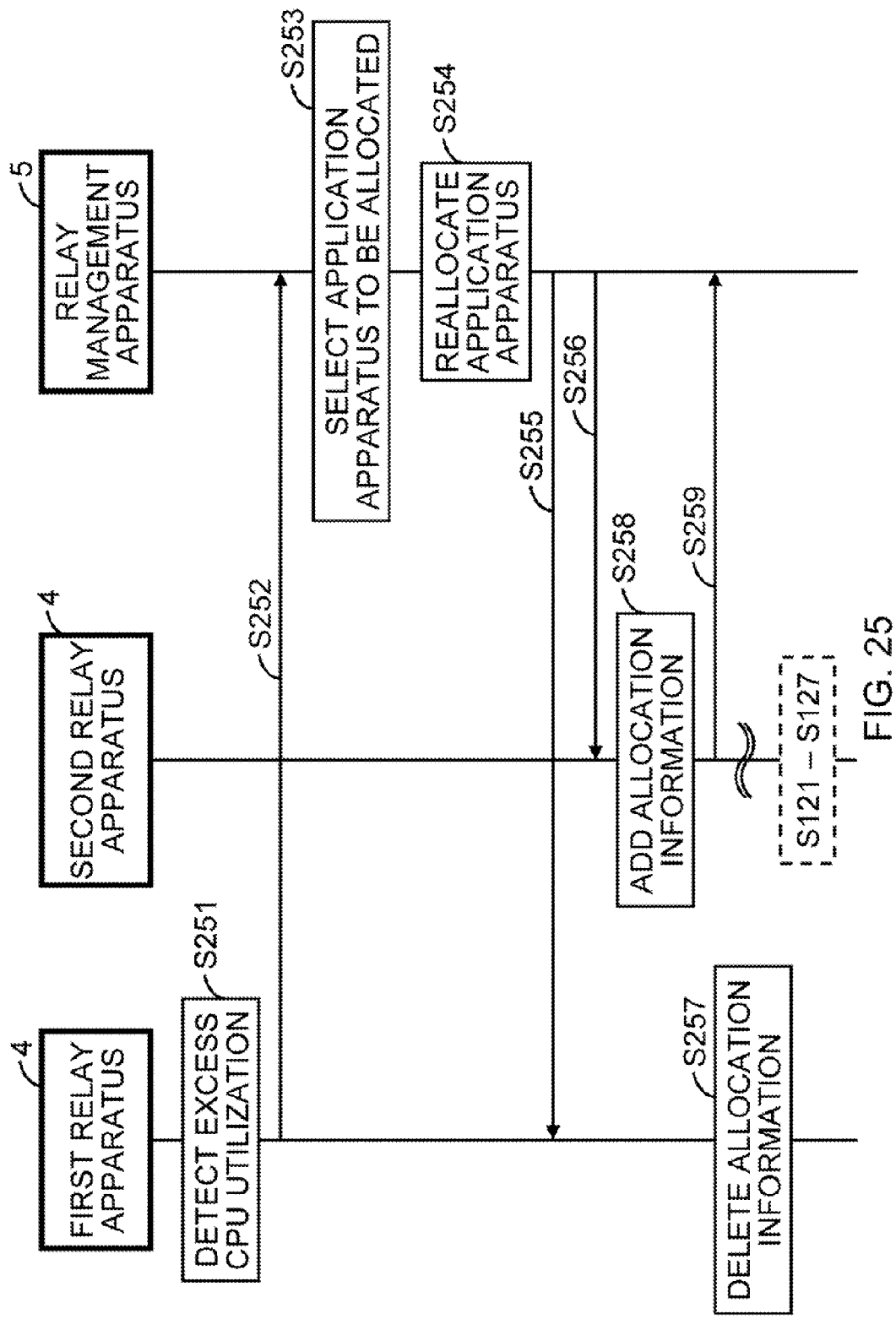
FIG. 25 is a diagram illustrating an exemplary process for reallocating an application apparatus according to an embodiment of the present invention.

FIG. 25 illustrates an exemplary process for reallocating an application apparatus 20 according to the present embodiment. Referring to FIG. 25, an exemplary process for reallocating an application apparatus 20 allocated to a present relay apparatus 40 to another relay apparatus 40 will be discussed as in a case in which the CPU utilization of the present relay apparatus 40 exceeds the CPU utilization threshold. Unlike the first embodiment, the relay management apparatus 50 selects an application apparatus 20 to be reallocated in the present embodiment.

In S251, the first relay apparatus 40 detects that the CPU utilization has exceeded the CPU utilization threshold.

In S252, the first relay apparatus 40 transmits a request for reallocating an application apparatus 20 to the relay management apparatus 50.

In S253, the relay management apparatus 50 selects an application apparatus 20 to be reallocated.

In S254, the relay management apparatus 50 selects a second relay apparatus 40 to which the application apparatus 20 will be reallocated, and reallocates the application apparatus 20 to the selected second relay apparatus 40.

S255 to S259 are similar to S135 to S139, and the discussion thereof is omitted.

In the present embodiment, during periodical process for collecting VM statistical information performed in the relay apparatus 40, the following process is performed in addition to the process of the first embodiment illustrated in FIG. 16. That is, whenever the application apparatus management unit 220 updates the application apparatus management table 110, the application apparatus management unit 220 transmits the update information of the application apparatus management table 110 to the relay management apparatus communication unit 210. Then, the relay management apparatus communication unit 210 transmits the received update information of the application apparatus management table 110 to the relay management apparatus 50.

Figure 26:
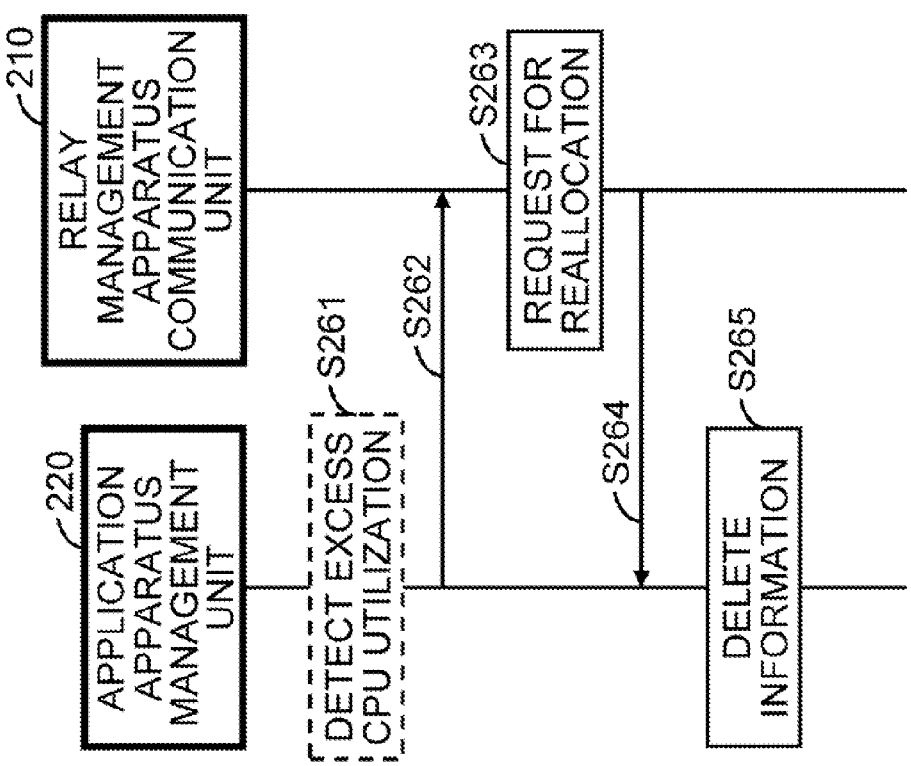
FIG. 26 is a diagram illustrating an exemplary process within a relay apparatus for reallocating an application apparatus according to an embodiment of the present invention.

FIG. 26 illustrates an exemplary process within a present relay apparatus 40 for reallocating an application apparatus 20 allocated to the present relay apparatus 40 to another relay apparatus 40 when the CPU utilization of the present relay apparatus 40 has exceeded the CPU utilization threshold.

In S261, the application apparatus management unit 220 detects that the CPU utilization of the present relay apparatus 40 has exceeded the CPU utilization threshold stored in the common information table 130.

In S262, the application apparatus management unit 220 transmits a request for reallocating an application apparatus 20 to the relay management apparatus communication unit 210.

In S263, the relay management apparatus communication unit 210 transmits a request for reallocating an application apparatus 20 to the relay management apparatus 50.

In S264, upon receipt of an IP address of a reallocated application apparatus 20 and a response message indicating that reallocation has been completed from the relay management apparatus 5, the relay management apparatus communication unit 210 transmits the IP address of the reallocated application apparatus 20 and a response indicating that reallocation has been completed to the application apparatus management unit 220.

In S265, upon receipt of the IP address of the reallocated application apparatus 20 and the response from the relay management apparatus communication unit 210, the application apparatus management unit 220 deletes the record of the application apparatus management table 110 for the reallocated application apparatus 20 on the basis of the received IP address of the reallocated application apparatus 20.

Next, operations of the components included in the relay management apparatus 50 will be discussed.

Figure 27:
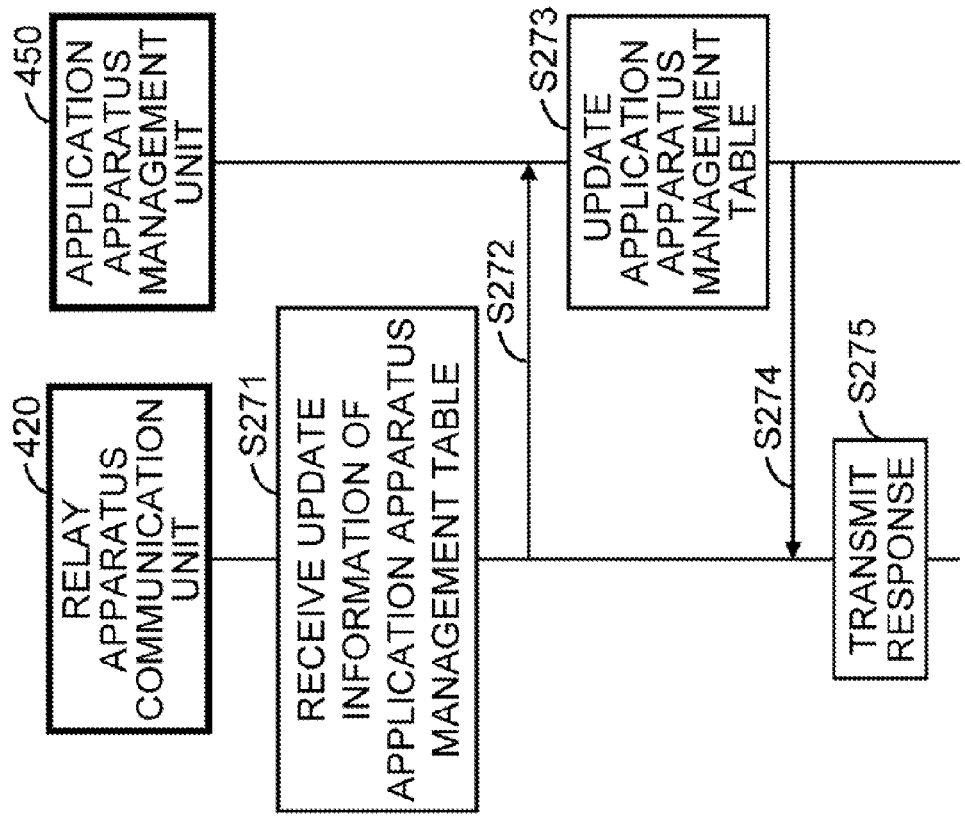
FIG. 27 is a diagram illustrating an exemplary process within a relay management apparatus according to an embodiment of the present invention.

FIG. 27 illustrates an exemplary process performed in the relay management apparatus 50 when update information of the application apparatus management table 110 is received from the relay apparatus 40.

In S271, the relay apparatus communication unit 420 receives update information of the application apparatus management table 110 from the relay apparatus 40.

In S272, the relay apparatus communication unit 420 transmits the update information of the application apparatus management table 110 to the application apparatus management unit 450.

In S273, the application apparatus management unit 450 updates the application apparatus management table 350 so as to reflect the received update information of the application apparatus management table 110.

In S274, the application apparatus management unit 450 transmits a response indicating that the application apparatus management table 350 has been updated to the relay apparatus communication unit 420.

In S275, the relay apparatus communication unit 420 transmits a response indicating that the application apparatus management table 350 has been updated to the relay apparatus 40 which has transmitted the update information.

Figure 28:
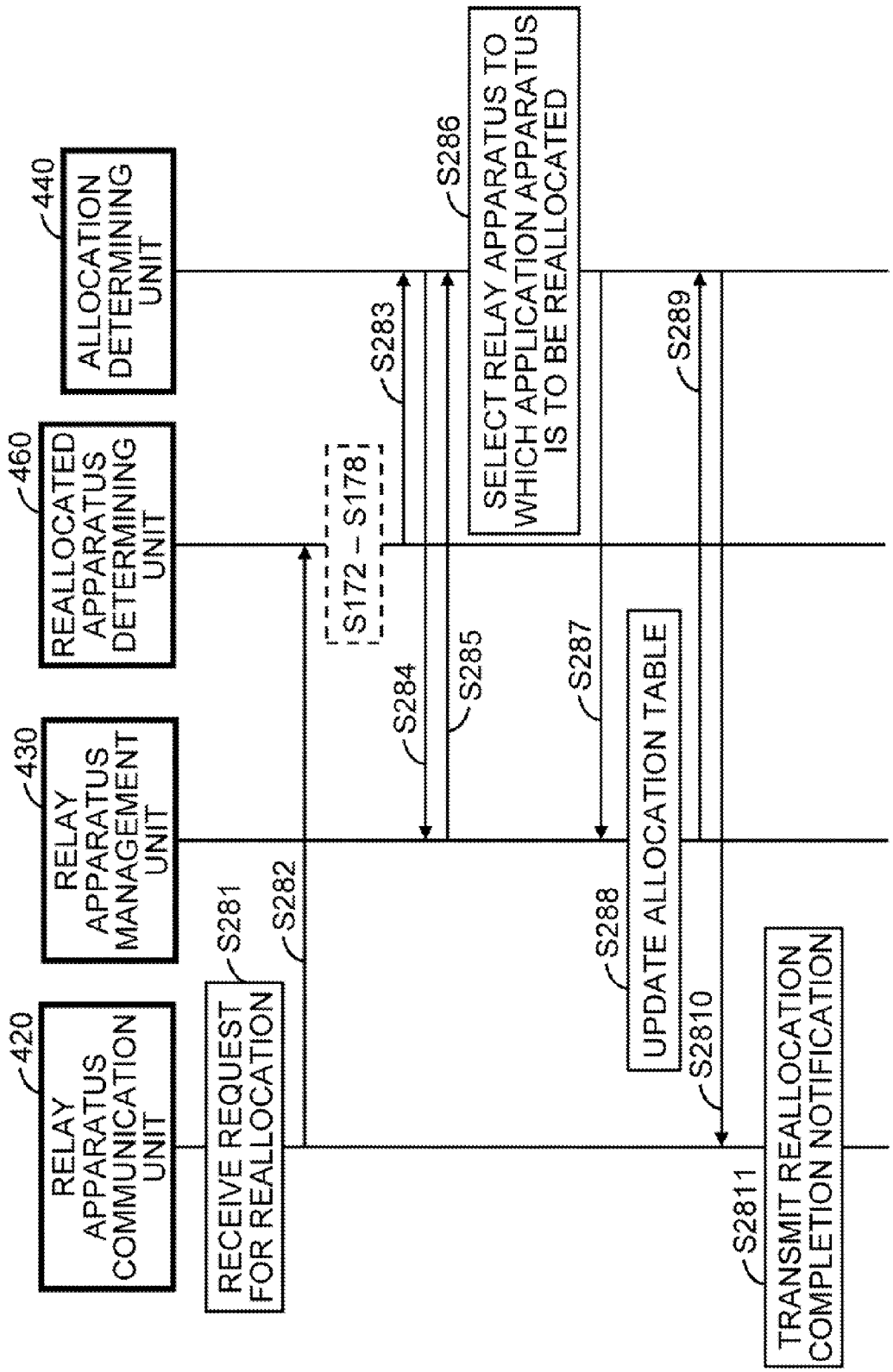
FIG. 28 is a diagram illustrating an exemplary process within a relay management apparatus according to an embodiment of the present invention.

FIG. 28 illustrates an exemplary process in the relay management apparatus 50 for reallocating an application apparatus 20 when a request for reallocating an application apparatus 20 has been received from a relay apparatus 40.

In S281, the relay apparatus communication unit 420 receives from the relay apparatus 40 a request to reallocate an application apparatus 20 to another relay apparatus 40.

In S282, the relay apparatus communication unit 420 notifies the reallocated apparatus determining unit 460 of the IP address of the relay apparatus 40 which has transmitted the request.

Here, the reallocated apparatus determining unit 460 selects an application apparatus 20 to be reallocated through operations similar to S172 to S178 performed in the relay apparatus 4. Unlike the first embodiment, the reallocated apparatus determining unit 460 requests the application apparatus management unit 450 to provide notification of application apparatuses 20, only among the application apparatuses 20 allocated to the relay apparatus 40 which has transmitted the request, which are reallocatable to another relay apparatus 40 and of the last transfer amounts of the application apparatuses 20. The application apparatuses 20 allocated to the relay apparatus 40 which has transmitted the request may be determined with reference to the allocation table 320.

In S283, the reallocated apparatus determining unit 460, after selecting an application apparatus 20 to be reallocated, notifies the allocation determining unit 440 of the IP address of the selected application apparatus 20 and the IP address of the relay apparatus 40 which has transmitted the request for reallocating an application apparatus 20.

S284 to S2811 are similar to S213 to S2110, and the discussion thereof is omitted.

Note that the application apparatus management unit 450, in the above-discussed process for selecting an application apparatus 20 to be reallocated, changes the reallocation status, for the selected application apparatus 20, stored in the application apparatus management table 350 to "under reallocation" (refer to S177). Hence, the application apparatus management unit 450, after completion of reallocation, changes this reallocation status to "reallocatable".

In the present embodiment, the relay management apparatus 50 selects an application apparatus 20 to be reallocated, similarly as discussed above, also in reallocation of an application apparatus 20 performed when a relay apparatus 40 fails to receive VM statistical information from the application apparatus 20 in periodical process for collecting VM statistical information.

According to the present embodiment, the relay apparatus may select both the application apparatus to be reallocated and the relay apparatus to which the selected application apparatus is to be reallocated. Even in such a configuration, a system as a whole has advantages similar to those in the first embodiment.

As an example other than the examples discussed in the first and second embodiments, a relay apparatus may reallocate an application apparatus, for which the relay apparatus is performing a relay process, to another relay apparatus in a configuration without a relay management apparatus. In such a configuration, the relay apparatus may select an application apparatus to be reallocated on the basis of reallocation statuses of application apparatuses as discussed above, by managing the reallocation statuses of application apparatuses by itself.

Hardware Configuration

Figure 29:
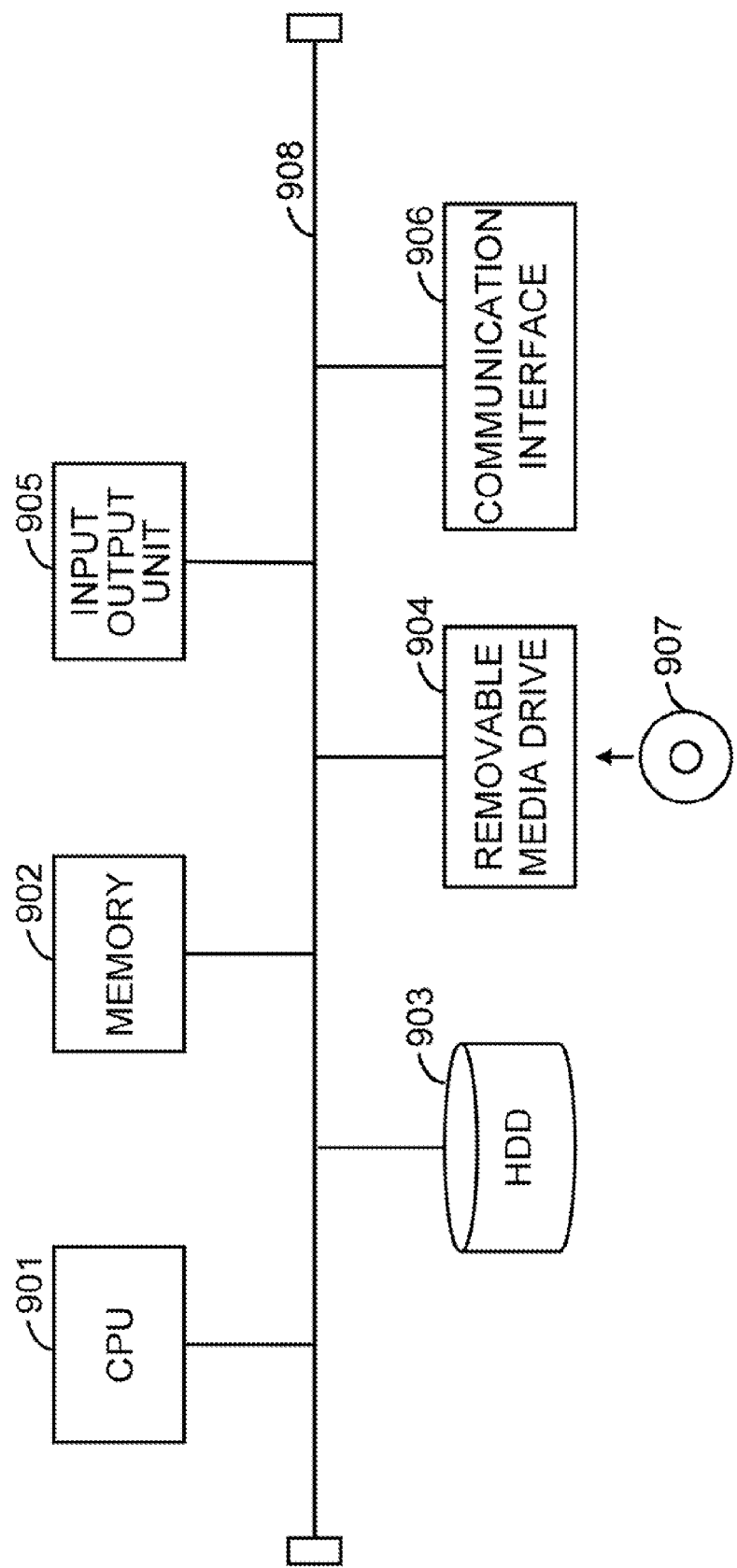
FIG. 29 is a diagram illustrating an exemplary hardware configuration of a computer.

The relay apparatus and the relay management apparatus may be realized by a conventional computer with an appropriate program. FIG. 29 illustrates an exemplary hardware configuration of a computer. The computer includes a CPU 901, a memory 902, an HDD 903, a removable media drive 904, an input output unit 905, and a communication interface 906.

The CPU 901 includes a control unit, arithmetic unit, an instruction decoder, and the like, and an execution unit performs arithmetic and logical operations using the arithmetic unit in accordance with the instructions of a program decoded by the instruction decoder in response to control signals output from the control unit. The CPU 901 may include a plurality of CPU cores.

The memory 902 is a random access memory (RAM), for example. The memory 902 is a main memory in which a program executed by the CPU 901 is loaded and data used in the processing of the CPU 901 is stored. The HDD 903 may be a flash memory or the like. The HDD 903 stores programs and various data. The removable media drive 904 is a device that reads data and programs stored in a removable medium 907. An example of the removable medium 907 is a magnetic disk, an optical disk, a magneto-optic disk, or a flash memory. The physical CPU 901 executes programs stored in the HDD 903 or the removable medium 907, in cooperation with the memory 902 and the HDD 903. Programs executed by the physical CPU 901 and accessed data may be stored in other apparatuses communicable with the computer.

The input output unit 905 is a keyboard and a display, for example. The input output unit 905 receives operation commands through a user operation, for example, and outputs processing results obtained by the computer. The communication interface 906 is a LAN card, for example. The communication interface 906 enables data communication with external apparatuses. These components of the computer discussed above are connected to each other via a bus 908.

Note that the functional configuration and physical configuration of the information processing apparatus discussed above are not limited to the examples discussed above, and the functions and physical resources may be integrated or distributed for realizing the apparatus.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been discussed in detail, it should be understood that the various changes, substitutions, and alterations could be made hereto without departing from the spirit and scope of the invention.

What is claimed is:

1. A computer-readable, non-transitory medium storing a program that causes a relay apparatus to execute a reallocation process, the relay apparatus transferring data received from an information processing apparatus allocated to the relay apparatus to a destination apparatus, the reallocation process comprising:
    determining reallocatability of the information processing apparatus on the basis of a status of receiving transfer data from the information processing apparatus, the reallocatability representing whether the information processing apparatus is reallocatable to another apparatus;
    storing reallocatability information indicating the determined reallocatability in a storage unit;
    determining whether to reallocate the information processing apparatus on the basis of the reallocatability information stored in the storage unit;
    reallocating the information processing apparatus determined to be reallocated,
        storing in the storage unit, upon receiving transfer data from the information processing apparatus, transfer amount information indicating an amount of the received transfer data; and
        determining the reallocatability as nonreallocatable when a value indicating variation of the amounts of transfer data exceeds a predetermined threshold.

2. The computer-readable, non-transitory medium according to claim 1, the reallocation process further comprising:
    determining the reallocatability as nonreallocatable while receiving transfer data from the information processing apparatus.

3. The computer-readable, non-transitory medium according to claim 1, the reallocation process further comprising:
    determining the reallocatability as nonreallocatable when a failure has occurred while receiving transfer data from the information processing apparatus.

4. A computer-readable, non-transitory medium storing a program that causes a relay management apparatus to execute a reallocation process, the relay management apparatus managing a plurality of relay apparatuses including a first relay apparatus transferring data received from one of information processing apparatuses allocated to the first relay apparatus to a destination apparatus, the reallocation process comprising:
    determining reallocatability of each information processing apparatus allocated to the first relay apparatus on the basis of a status, in the first relay apparatus, of receiving transfer data from the each information processing apparatus, the reallocatability representing whether the each information processing apparatus is reallocatable to a relay apparatus other than the first relay apparatus;
    storing reallocatability information indicating the determined reallocatability of the each information processing apparatus in a storage unit;

selecting, upon receiving a request for reallocation from the first relay apparatus, an information processing apparatus to be reallocated on the basis of the reallocatability information stored in the storage unit;

selecting, from among the plurality of relay apparatuses, a second relay apparatus to which the selected information processing apparatus is reallocated;

reallocating the selected information processing apparatus to the second relay apparatus;

storing in the storage unit, upon the first relay apparatus receiving transfer data from the information processing apparatus, transfer amount information indicating an amount of the received transfer data; and determining the reallocatability as nonreallocatable when a value indicating variation of the amounts of transfer data exceeds a predetermined threshold.

5. The computer-readable, non-transitory medium according to claim 4, the reallocation process further comprising:

determining the reallocatability of the each information processing apparatus as nonreallocatable while the first relay apparatus receiving transfer data from the each information processing apparatus.

6. The computer-readable, non-transitory medium according to claim 4, the reallocation process further comprising:

determining the reallocatability of the each information processing apparatus as nonreallocatable when a failure has occurred in the first relay apparatus while receiving transfer data from the each information processing apparatus.

7. The computer-readable, non-transitory medium according to claim 4, the reallocation process further comprising:

receiving load information indicating a status of loads for each of the plurality of relay apparatuses;

storing the received load information in the storage unit; and selecting the second relay apparatus having loads smaller than loads of other relay apparatuses on the basis of the stored load information.

8. The computer-readable, non-transitory medium according to claim 4, the reallocation process further comprising:

receiving large-variation load information indicating a status of large-variation loads for each of the plurality of relay apparatuses, the large-variation loads being loads for processing large-variation transfer data, wherein variation of amounts of the large-variation transfer data exceeds a predetermined threshold;

storing the received large-variation load information in the storage unit; and selecting the second relay apparatus having large-variation loads smaller than large-variation loads of other relay apparatuses on the basis of the stored large-variation load information.

9. A relay apparatus for transferring data received from an information processing apparatus allocated to the relay apparatus to a destination apparatus, the relay apparatus comprising:

a storage unit to store reallocatability information indicating reallocatability of the information processing apparatus, the reallocatability representing whether the information processing apparatus is reallocatable to another apparatus; and a processor to determine the reallocatability of the information processing apparatus on the basis of a status of receiving transfer data from the information processing apparatus, store reallocatability information indicating the determined reallocatability in the storage unit, determine whether to reallocate the information processing apparatus on the basis of the reallocatability information stored in the storage unit, reallocate the information processing apparatus determined to be reallocated, store in the storage unit, upon receiving transfer data from the information processing apparatus, transfer amount information indicating an amount of the received transfer data; and determine the reallocatability as nonreallocatable when a value indicating variation of the amounts of transfer data exceeds a predetermined threshold.

10. A relay management apparatus for managing a plurality of relay apparatuses including a first relay apparatus transferring data received from one of information processing apparatuses allocated to the first relay apparatus to a destination apparatus, the relay management apparatus comprising:

a storage unit to store reallocatability information indicating reallocatability of each information processing apparatus, the reallocatability representing whether the each information processing apparatus is reallocatable to a relay apparatus other than the first relay apparatus; and a processor to determine the reallocatability of the each information processing apparatus allocated to the first relay apparatus on the basis of a status, in the first relay apparatus, of receiving transfer data from the each information processing apparatus, store reallocatability information indicating the determined reallocatability of the each information processing apparatus in the storage unit, select, upon receiving a request for reallocation from the first relay apparatus, an information processing apparatus to be reallocated on the basis of the reallocatability information stored in the storage unit, select, from among the plurality of relay apparatuses, a second relay apparatus to which the selected information processing apparatus is reallocated, reallocate the selected information processing apparatus to the second relay apparatus;

store in the storage unit, upon receiving transfer data from the information processing apparatus, transfer amount information indicating an amount of the received transfer data; and determine the reallocatability as nonreallocatable when a value indicating variation of the amounts of transfer data exceeds a predetermined threshold.

* * * * *